United States Patent
Sarkis et al.

(10) Patent No.: US 11,689,314 B2
(45) Date of Patent: Jun. 27, 2023

(54) FLEXIBLE IMPLICIT MODULATION AND CODING SCHEME INDICATION

(71) Applicant: QUALCOMM Incorporated, San Diego, CA (US)

(72) Inventors: Gabi Sarkis, San Diego, CA (US); Joseph Binamira Soriaga, San Diego, CA (US); Alexandros Manolakos, Escondido, CA (US); Muhammad Sayed Khairy Abdelghaffar, San Jose, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 16/992,945

(22) Filed: Aug. 13, 2020

(65) Prior Publication Data
US 2021/0050938 A1 Feb. 18, 2021

(30) Foreign Application Priority Data
Aug. 14, 2019 (GR) .............................. 20190100357

(51) Int. Cl.
*H04L 1/00* (2006.01)
(52) U.S. Cl.
CPC .......... *H04L 1/0039* (2013.01); *H04L 1/0003* (2013.01); *H04L 1/0009* (2013.01); *H04L 1/0016* (2013.01)
(58) Field of Classification Search
None
See application file for complete search history.

(56) References Cited

U.S. PATENT DOCUMENTS

| | | | |
|---|---|---|---|
| 2003/0097629 A1* | 5/2003 | Moon ................... | H04L 1/1819 714/751 |
| 2003/0147474 A1* | 8/2003 | Ha ........................ | H04L 1/0003 375/295 |

(Continued)

FOREIGN PATENT DOCUMENTS

| KR | 20140114254 A | * | 9/2014 |
| WO | WO-2018230967 A1 | | 12/2018 |

OTHER PUBLICATIONS

International Search Report and Written Opinion—PCT/US2020/046422—ISA/EPO—dated Nov. 16, 2020.

(Continued)

*Primary Examiner* — The Hy Nguyen
(74) *Attorney, Agent, or Firm* — Holland & Hart LLP/Qualcomm Incorporated

(57) ABSTRACT

Methods, systems, and devices for wireless communications are described. Generally, the described techniques provide for a base station transmitting a modulation and coding scheme index corresponding to a modulation and coding scheme table to a user equipment (UE). The modulation and coding scheme index may be applied to encoding or decoding a transport block. The modulation and coding scheme may be associated with at least two modulation orders or a differential indication according to a modulation and coding scheme table. To determine which of the modulation orders for processing the transport block, the UE and the base station may use a prior modulation order associated with a prior transmission of the transport block. The UE may process the transport block by encoding or decoding the transport block based at least in part on the determined modulation order.

27 Claims, 17 Drawing Sheets

(56) References Cited

U.S. PATENT DOCUMENTS

| | | | |
|---|---|---|---|
| 2012/0026963 A1* | 2/2012 | Kim | H04L 1/1896 |
| | | | 370/329 |
| 2015/0382328 A1* | 12/2015 | Jiang | H04W 72/048 |
| | | | 370/329 |
| 2016/0226623 A1 | 8/2016 | Froberg Olsson et al. | |
| 2016/0294593 A1 | 10/2016 | Yi et al. | |
| 2018/0205488 A1* | 7/2018 | Rico Alvarino | H04L 27/0012 |
| 2018/0324015 A1 | 11/2018 | Yi et al. | |
| 2018/0375630 A1* | 12/2018 | Kim | H04W 72/042 |
| 2020/0067628 A1* | 2/2020 | Xu | H04L 1/0004 |
| 2020/0136746 A1* | 4/2020 | Li | H04L 27/0012 |
| 2020/0412431 A1* | 12/2020 | Park | H04W 24/10 |

OTHER PUBLICATIONS

LG Electronics: "Discussions on CQI and MCS Tables", 3GPP Draft, 3GPP TSG RAN WG1 Meeting #90bis, R1-1717943, CQI and MCS, 3rd Generation Partnership Project (3GPP), Mobile Competence Centre, 650, Route Des Lucioles, F-06921 Sophia-Antipolis Cedex, France, vol. RAN WG1, No. Prague, Czech, Republic, Oct. 9, 2017-Oct. 13, 2017, Oct. 8, 2017 (Oct. 8, 2017), XP051341127, 5 pages, Retrieved from the Internet: URL: http://www.3gpp.org/ftp/meetings_3GPP_SYNC/RAN1/Docs/ [retrieved on Oct. 8, 2017] Sub-section "Reserved state"; p. 4.

* cited by examiner

| $I_{MCS}$ | $Q_m$ | $R$ | $SE$ |
|---|---|---|---|
| 28 | 2 or 4 | reserved | |
| 29 | 4 or 6 | reserved | |
| 30 | 6 or 8 | reserved | |
| 31 | 8 or 10 | reserved | |

↳ 300-a

| $I_{MCS}$ | $Q_m$ | $R$ | $SE$ |
|---|---|---|---|
| 28 | 2 or 10 | reserved | |
| 29 | 4 | reserved | |
| 30 | 6 | reserved | |
| 31 | 8 | reserved | |

305 ↰  ↳ 300-b

| $I_{MCS}$ | $Q_m$ | $R$ | $SE$ |
|---|---|---|---|
| 29 | 4 or 6 | reserved | |
| 30 | 4 or 8 | reserved | |
| 31 | 6 or 10 | reserved | |

↳ 300-c

| $I_{MCS}$ | $Q_m$ | $R$ | $SE$ |
|---|---|---|---|
| 28 | 2 | reserved | |
| 29 | 4 | reserved | |
| 30 | 6 | reserved | |
| 31 | 8 or 10 | reserved | |

↳ 300-d

| $I_{MCS}$ | $Q_{m,0}$ | $Q_{m,1}$ | $R$ | $SE$ |
|---|---|---|---|---|
| 30 | 6 | 8 | reserved | |
| 31 | 8 | 10 | reserved | |

| $I_{MCS}$ | $Q_m$ | R | SE |
|---|---|---|---|
| 28 | -3 | reserved | |
| 29 | -2 | reserved | |
| 30 | -1 | reserved | |
| 31 | 0 | reserved | |

400-a

| $I_{MCS}$ | $Q_m$ | R | SE |
|---|---|---|---|
| 29 | -4 | reserved | |
| 30 | -2 | reserved | |
| 31 | -1 | reserved | |

FLEXIBLE IMPLICIT MODULATION AND CODING SCHEME INDICATION

CROSS REFERENCE

The present Application for Patent claims the benefit of Greek Provisional Patent Application No. 20190100357 by SARKIS et al., entitled "FLEXIBLE IMPLICIT MODULATION AND CODING SCHEME INDICATION," filed Aug. 14, 2019, assigned to the assignee hereof, and expressly incorporated by reference herein.

FIELD OF TECHNOLOGY

The following relates generally to wireless communications and more specifically to flexible implicit modulation and coding scheme indication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, wireless communications systems may use different modulation schemes for wireless transmissions, such as binary phase shift keying (BPSK), quadrature phase shift keying (QPSK), 16 quadrature amplitude modulation (QAM), or 64 QAM, for example. Different coding schemes may be used in conjunction with different modulation schemes to enhance the likelihood of successful reception of transmissions. In some cases, a UE may measure channel conditions and provide a channel quality indication (CQI) report to a base station, which the base station may use to select a modulation and coding scheme for subsequent communications with the UE. In some cases, the UE references a modulating and coding scheme table for determining a modulation scheme, and the modulating and coding scheme table may include a limited amount of information.

SUMMARY

The described techniques relate to improved methods, systems, devices, and apparatuses that support flexible implicit modulation and coding scheme indication. Generally, the described techniques provide for a base station transmitting a modulation and coding scheme index corresponding to a modulation and coding scheme table to a user equipment (UE). The modulation and coding scheme index may be applied to encoding or decoding a transport block. The modulation and coding scheme may be associated with at least two modulation orders according to a modulation and coding scheme table. To determine the modulation orders associated with the indicated index to be used by a UE to process the transport block, the UE and the base station may make use a prior modulation order associated with a prior transmission of the transport block. For example, the devices may compare the prior modulation order to a prior modulation order threshold to determine which of at least two indicated modulation orders to use to process the transport block. The UE may process the transport block by encoding or decoding the transport block based at least in part on the determined modulation order.

The techniques may also provide for a base station transmitting a modulation and coding scheme index corresponding to a modulation and coding scheme table to a user equipment (UE). The modulation and coding scheme may be applied to encoding or decoding a transport block. The modulation and coding scheme may be associated with a differential indication of a modulation order. To determine the modulation order to be used for processing the transport block, the UE and the base station may use a prior modulation order associated with a prior transmission of the transport block. For example, the devices may determine the modulation order to use to process the transport block based on the prior modulation order and the differential indication. The UE may process the transport block by encoding or decoding the transport block based at least in part on the determined modulation order.

A method of wireless communication at a UE is described. The method may include receiving, from a base station, an indication of a modulation and coding scheme index to be applied to encoding or decoding of a transport block, where the modulation and coding scheme index is associated with at least two modulation orders, determining a modulation order of the at least two modulation orders based on a prior modulation order associated with a prior transmission of the transport block, and processing the transport block by encoding or decoding the transport block based on the determined modulation order.

An apparatus for wireless communication at a UE is described. The apparatus may include a processor, memory coupled with the processor, and instructions stored in the memory. The instructions may be executable by the processor to cause the apparatus to receive, from a base station, an indication of a modulation and coding scheme index to be applied to encoding or decoding of a transport block, where the modulation and coding scheme index is associated with at least two modulation orders, determine a modulation order of the at least two modulation orders based on a prior modulation order associated with a prior transmission of the transport block, and process the transport block by encoding or decoding the transport block based on the determined modulation order.

Another apparatus for wireless communication at a UE is described. The apparatus may include means for receiving, from a base station, an indication of a modulation and coding scheme index to be applied to encoding or decoding of a transport block, where the modulation and coding scheme index is associated with at least two modulation orders, determining a modulation order of the at least two modulation orders based on a prior modulation order associated with a prior transmission of the transport block, and processing the transport block by encoding or decoding the transport block based on the determined modulation order.

A non-transitory computer-readable medium storing code for wireless communication at a UE is described. The code may include instructions executable by a processor to receive, from a base station, an indication of a modulation and coding scheme index to be applied to encoding or decoding of a transport block, where the modulation and coding scheme index is associated with at least two modulation orders, determine a modulation order of the at least two modulation orders based on a prior modulation order associated with a prior transmission of the transport block, and process the transport block by encoding or decoding the transport block based on the determined modulation order.

In some examples of the method, apparatuses, and non-transitory computer-readable medium described herein, determining the modulation order further may include operations, features, means, or instructions for comparing the prior modulation order to a modulation order threshold, and determining the modulation order based on the comparing.

Some examples of the method, apparatuses, and non-transitory computer-readable medium described herein may further include operations, features, means, or instructions for determining the prior modulation order in accordance with a control signal scheduling the prior transmission of the transport block, where the prior transmission of the transport block may be a most recent transmission of the transport block.

In some examples of the method, apparatuses, and non-transitory computer-readable medium described herein, the control signal indicates a modulation and coding scheme index associated with a target code rate for the most recent transmission of the transport block.

In some examples of the method, apparatuses, and non-transitory computer-readable medium described herein, the prior transmission may be a most recent prior transmission of the transport block transmitted with a modulation and coding scheme index that corresponds to a single modulation order.

Some examples of the method, apparatuses, and non-transitory computer-readable medium described herein may further include operations, features, means, or instructions for determining the prior modulation order in accordance with a control signal scheduling the prior transmission of the transport block, where the prior transmission may be a first detected transmission of the transport block.

In some examples of the method, apparatuses, and non-transitory computer-readable medium described herein, the control signal includes an activation downlink control information transmission.

In some examples of the method, apparatuses, and non-transitory computer-readable medium described herein, the control signal includes a radio resource control transmission.

In some examples of the method, apparatuses, and non-transitory computer-readable medium described herein, processing the transport block may include operations, features, means, or instructions for encoding the transport block in accordance with the determined modulation order, and transmitting the encoded transport block to the base station.

In some examples of the method, apparatuses, and non-transitory computer-readable medium described herein, processing the transport block may include operations, features, means, or instructions for receiving the transport block encoded in accordance with the determined modulation order, and decoding the encoded transport block in accordance with the determined modulation order.

In some examples of the method, apparatuses, and non-transitory computer-readable medium described herein, the modulation and coding scheme index may be associated with the at least two modulation orders in accordance with a modulation and coding scheme table, where each modulation and coding scheme index of the modulation and coding scheme table may be associated with at least two modulation orders.

In some examples of the method, apparatuses, and non-transitory computer-readable medium described herein, the modulation and coding scheme index may be associated with the at least two modulation orders in accordance with a modulation and coding scheme table, where at least a subset of modulation and coding scheme indices of the modulation and coding scheme table may be associated with at least two modulation orders.

In some examples of the method, apparatuses, and non-transitory computer-readable medium described herein, each modulation and coding scheme index associated with a modulation order of a modulation and coding scheme index table includes an indication of a target code rate.

Some examples of the method, apparatuses, and non-transitory computer-readable medium described herein may further include operations, features, means, or instructions for at least two modulation orders, an identification of the prior transmission, a modulation order threshold, or a combination thereof being predefined at the UE.

Some examples of the method, apparatuses, and non-transitory computer-readable medium described herein may further include operations, features, means, or instructions for receiving a radio resource control signal indicating the at least two modulation orders, an identification of the prior transmission, a modulation order threshold, or a combination thereof.

A method of wireless communication at a UE is described. The method may include receiving, from a base station, an indication of a modulation and coding scheme index to be applied to encoding or decoding of a transport block, where the modulation and coding scheme index is associated with a differential indication of a modulation order, determining a modulation order for encoding or decoding the transport block based on the differential indication and a prior modulation order associated with a prior transmission of the transport block, and processing the transport block by encoding or decoding the transport block based on the determined modulation order.

An apparatus for wireless communication at a UE is described. The apparatus may include a processor, memory coupled with the processor, and instructions stored in the memory. The instructions may be executable by the processor to cause the apparatus to receive, from a base station, an indication of a modulation and coding scheme index to be applied to encoding or decoding of a transport block, where the modulation and coding scheme index is associated with a differential indication of a modulation order, determine a modulation order for encoding or decoding the transport block based on the differential indication and a prior modulation order associated with a prior transmission of the transport block, and process the transport block by encoding or decoding the transport block based on the determined modulation order.

Another apparatus for wireless communication at a UE is described. The apparatus may include means for receiving, from a base station, an indication of a modulation and coding scheme index to be applied to encoding or decoding of a transport block, where the modulation and coding scheme index is associated with a differential indication of a modulation order, determining a modulation order for encoding or decoding the transport block based on the differential indication and a prior modulation order associated with a prior transmission of the transport block, and processing the transport block by encoding or decoding the transport block based on the determined modulation order.

A non-transitory computer-readable medium storing code for wireless communication at a UE is described. The code may include instructions executable by a processor to receive, from a base station, an indication of a modulation and coding scheme index to be applied to encoding or decoding of a transport block, where the modulation and coding scheme index is associated with a differential indication of a modulation order, determine a modulation order for encoding or decoding the transport block based on the differential indication and a prior modulation order associated with a prior transmission of the transport block, and process the transport block by encoding or decoding the transport block based on the determined modulation order.

Some examples of the method, apparatuses, and non-transitory computer-readable medium described herein may further include operations, features, means, or instructions for comparing the prior modulation order to a modulation order threshold, and determining the differential indication of the at least two differential indications based on the comparing.

Some examples of the method, apparatuses, and non-transitory computer-readable medium described herein may further include operations, features, means, or instructions for identifying the modulation order as a minimum modulation order of a modulation and coding scheme index table based on the differential indication and the prior modulation order.

Some examples of the method, apparatuses, and non-transitory computer-readable medium described herein may further include operations, features, means, or instructions for identifying the modulation order from a modulation and coding scheme index table based on the differential indication and the prior modulation order, where the differential indication specifies a higher modulation and coding scheme index than the modulation and coding scheme index associated with the prior transmission.

Some examples of the method, apparatuses, and non-transitory computer-readable medium described herein may further include operations, features, means, or instructions for determining the prior modulation order in accordance with a control signal scheduling the prior transmission of the transport block, where the prior transmission of the transport block may be a most recent transmission of the transport block.

In some examples of the method, apparatuses, and non-transitory computer-readable medium described herein, the control signal indicates a modulation and coding scheme index associated with a target code rate.

Some examples of the method, apparatuses, and non-transitory computer-readable medium described herein may further include operations, features, means, or instructions for determining the prior modulation order in accordance with a control signal scheduling a first detected transmission of the transport block.

In some examples of the method, apparatuses, and non-transitory computer-readable medium described herein, the control signal includes an activation downlink control information transmission.

In some examples of the method, apparatuses, and non-transitory computer-readable medium described herein, the control signal includes a radio resource control transmission.

In some examples of the method, apparatuses, and non-transitory computer-readable medium described herein, processing the transport block may include operations, features, means, or instructions for encoding the transport block in accordance with the determined modulation order, and transmitting the encoded transport block to the base station.

In some examples of the method, apparatuses, and non-transitory computer-readable medium described herein, processing the transport block may include operations, features, means, or instructions for receiving the transport block encoded in accordance with the determined modulation order, and decoding the transport block in accordance with the determined modulation order.

Some examples of the method, apparatuses, and non-transitory computer-readable medium described herein may further include operations, features, means, or instructions for the differential indication, the prior modulation order, or a combination thereof being predefined at the UE.

Some examples of the method, apparatuses, and non-transitory computer-readable medium described herein may further include operations, features, means, or instructions for receiving, from the base station, a radio resource control signal indicating the differential indication, the prior modulation order, or a combination thereof.

A method of wireless communication at a base station is described. The method may include transmitting, to a UE, an indication of a modulation and coding scheme index to be applied to encoding or decoding of a transport block, where the modulation and coding scheme index is associated with at least two modulation orders, determining a modulation order of the at least two modulation orders based on a prior modulation order associated with a prior transmission of the transport block, and processing the transport block by encoding or decoding the transport block based on the determined modulation order.

An apparatus for wireless communication at a base station is described. The apparatus may include a processor, memory coupled with the processor, and instructions stored in the memory. The instructions may be executable by the processor to cause the apparatus to transmit, to a UE, an indication of a modulation and coding scheme index to be applied to encoding or decoding of a transport block, where the modulation and coding scheme index is associated with at least two modulation orders, determine a modulation order of the at least two modulation orders based on a prior modulation order associated with a prior transmission of the transport block, and process the transport block by encoding or decoding the transport block based on the determined modulation order.

Another apparatus for wireless communication at a base station is described. The apparatus may include means for transmitting, to a UE, an indication of a modulation and coding scheme index to be applied to encoding or decoding of a transport block, where the modulation and coding scheme index is associated with at least two modulation orders, determining a modulation order of the at least two modulation orders based on a prior modulation order associated with a prior transmission of the transport block, and processing the transport block by encoding or decoding the transport block based on the determined modulation order.

A non-transitory computer-readable medium storing code for wireless communication at a base station is described. The code may include instructions executable by a processor to transmit, to a UE, an indication of a modulation and coding scheme index to be applied to encoding or decoding of a transport block, where the modulation and coding scheme index is associated with at least two modulation orders, determine a modulation order of the at least two modulation orders based on a prior modulation order associated with a prior transmission of the transport block, and process the transport block by encoding or decoding the transport block based on the determined modulation order.

In some examples of the method, apparatuses, and non-transitory computer-readable medium described herein, determining the modulation order further may include operations, features, means, or instructions for comparing the prior modulation order to a modulation order threshold, and determining the modulation order based on the comparing.

Some examples of the method, apparatuses, and non-transitory computer-readable medium described herein may further include operations, features, means, or instructions for determining the prior modulation order in accordance with a transmitted control signal scheduling the prior transmission of the transport block, where the prior transmission of the transport block may be a most recent transmission of the transport block.

In some examples of the method, apparatuses, and non-transitory computer-readable medium described herein, the transmitted control signal indicates a modulation and coding scheme index associated with a target code rate for the prior transmission of the transport block.

In some examples of the method, apparatuses, and non-transitory computer-readable medium described herein, the prior transmission may be a most recent prior transmission of the transport block transmitted with a modulation and coding scheme index that corresponds to a single modulation order.

Some examples of the method, apparatuses, and non-transitory computer-readable medium described herein may further include operations, features, means, or instructions for determining the prior modulation order in accordance with a control signal scheduling the prior transmission of the transport block, where the prior transmission may be a first detected transmission of the transport block.

In some examples of the method, apparatuses, and non-transitory computer-readable medium described herein, the control signal includes an activation downlink control information transmission.

In some examples of the method, apparatuses, and non-transitory computer-readable medium described herein, the control signal includes a radio resource control transmission.

In some examples of the method, apparatuses, and non-transitory computer-readable medium described herein, processing the transport block may include operations, features, means, or instructions for encoding the transport block in accordance with the determined modulation order, and transmitting the encoded transport block to the UE.

In some examples of the method, apparatuses, and non-transitory computer-readable medium described herein, processing the transport block may include operations, features, means, or instructions for receiving the transport block from the UE, and decoding the encoded transport block in accordance with the determined modulation order.

In some examples of the method, apparatuses, and non-transitory computer-readable medium described herein, the modulation and coding scheme index may be associated with the at least two modulation orders in accordance with a modulation and coding scheme table, where each modulation and coding scheme index of the modulation and coding scheme table may be associated with at least two modulation orders.

In some examples of the method, apparatuses, and non-transitory computer-readable medium described herein, the modulation and coding scheme index may be associated with the at least two modulation orders in accordance with a modulation and coding scheme table, where at least a subset of modulation and coding scheme indices of the modulation and coding scheme table may be associated with at least two modulation orders.

In some examples of the method, apparatuses, and non-transitory computer-readable medium described herein, each modulation and coding scheme index associated with a modulation order of a modulation and coding scheme index table includes an indication of a target code rate.

Some examples of the method, apparatuses, and non-transitory computer-readable medium described herein may further include operations, features, means, or instructions for transmitting, to the UE, a radio resource control signal indicating the at least two modulation orders, an identification of the prior transmission, a modulation order threshold, or a combination thereof.

A method of wireless communications at a base station is described. The method may include transmitting, to a UE, an indication of a modulation and coding scheme index to be applied to encoding or decoding of a transport block, where the modulation and coding scheme index is associated with a differential indication of a modulation order, determining a modulation order for encoding or decoding the transport block based on the differential indication and a prior modulation order associated with a prior transmission of the transport block, and processing the transport block by encoding or decoding the transport block based on the determined modulation order.

An apparatus for wireless communications at a base station is described. The apparatus may include a processor, memory coupled with the processor, and instructions stored in the memory. The instructions may be executable by the processor to cause the apparatus to transmit, to a UE, an indication of a modulation and coding scheme index to be applied to encoding or decoding of a transport block, where the modulation and coding scheme index is associated with a differential indication of a modulation order, determine a modulation order for encoding or decoding the transport block based on the differential indication and a prior modulation order associated with a prior transmission of the transport block, and process the transport block by encoding or decoding the transport block based on the determined modulation order.

Another apparatus for wireless communications at a base station is described. The apparatus may include means for transmitting, to a UE, an indication of a modulation and coding scheme index to be applied to encoding or decoding of a transport block, where the modulation and coding scheme index is associated with a differential indication of a modulation order, determining a modulation order for encoding or decoding the transport block based on the differential indication and a prior modulation order associated with a prior transmission of the transport block, and processing the transport block by encoding or decoding the transport block based on the determined modulation order.

A non-transitory computer-readable medium storing code for wireless communications at a base station is described. The code may include instructions executable by a processor to transmit, to a UE, an indication of a modulation and coding scheme index to be applied to encoding or decoding of a transport block, where the modulation and coding scheme index is associated with a differential indication of a modulation order, determine a modulation order for encoding or decoding the transport block based on the differential indication and a prior modulation order associated with a prior transmission of the transport block, and process the transport block by encoding or decoding the transport block based on the determined modulation order.

Some examples of the method, apparatuses, and non-transitory computer-readable medium described herein may further include operations, features, means, or instructions for comparing the prior modulation order to a modulation order threshold, and determining the differential indication of the at least two differential indications based on the comparing.

Some examples of the method, apparatuses, and non-transitory computer-readable medium described herein may further include operations, features, means, or instructions for identifying the modulation order as a minimum modulation order of a modulation and coding scheme index table based on the differential indication and the prior modulation order.

Some examples of the method, apparatuses, and non-transitory computer-readable medium described herein may further include operations, features, means, or instructions for identifying the modulation order from a modulation and coding scheme index table based on the differential indication and the prior modulation order, where the differential indication specifies a higher modulation and coding scheme index than the modulation and coding scheme index associated with the prior transmission.

Some examples of the method, apparatuses, and non-transitory computer-readable medium described herein may further include operations, features, means, or instructions for determining the prior modulation order in accordance with a transmitted control signal scheduling the prior transmission of the transport block, where the prior transmission of the transport block may be a most recent transmission of the transport block.

In some examples of the method, apparatuses, and non-transitory computer-readable medium described herein, the transmitted control signal indicates a modulation and coding scheme index associated with a target code rate.

Some examples of the method, apparatuses, and non-transitory computer-readable medium described herein may further include operations, features, means, or instructions for determining the prior modulation order in accordance with a transmitted control signal scheduling a first detected transmission of the transport block.

In some examples of the method, apparatuses, and non-transitory computer-readable medium described herein, the transmitted control signal includes an activation downlink control information transmission.

In some examples of the method, apparatuses, and non-transitory computer-readable medium described herein, the transmitted control signal includes a radio resource control transmission.

In some examples of the method, apparatuses, and non-transitory computer-readable medium described herein, processing the transport block may include operations, features, means, or instructions for encoding the transport block in accordance with the determined modulation order, and transmitting the encoded transport block to the UE.

In some examples of the method, apparatuses, and non-transitory computer-readable medium described herein, processing the transport block may include operations, features, means, or instructions for receiving the transport block from the UE, and decoding the encoded transport block in accordance with the determined modulation order.

Some examples of the method, apparatuses, and non-transitory computer-readable medium described herein may further include operations, features, means, or instructions for transmitting, to the UE, a radio resource control signal indicating the differential indication, the prior modulation order, or a combination thereof.

BRIEF DESCRIPTION OF THE DRAWINGS

FIG. 3 illustrates examples of modulation and coding scheme tables that support flexible implicit modulation and coding scheme indication in accordance with aspects of the present disclosure.

FIG. 4 illustrates examples of modulation and coding scheme tables that support flexible implicit modulation and coding scheme indication in accordance with aspects of the present disclosure.

DETAILED DESCRIPTION

Figure 1:
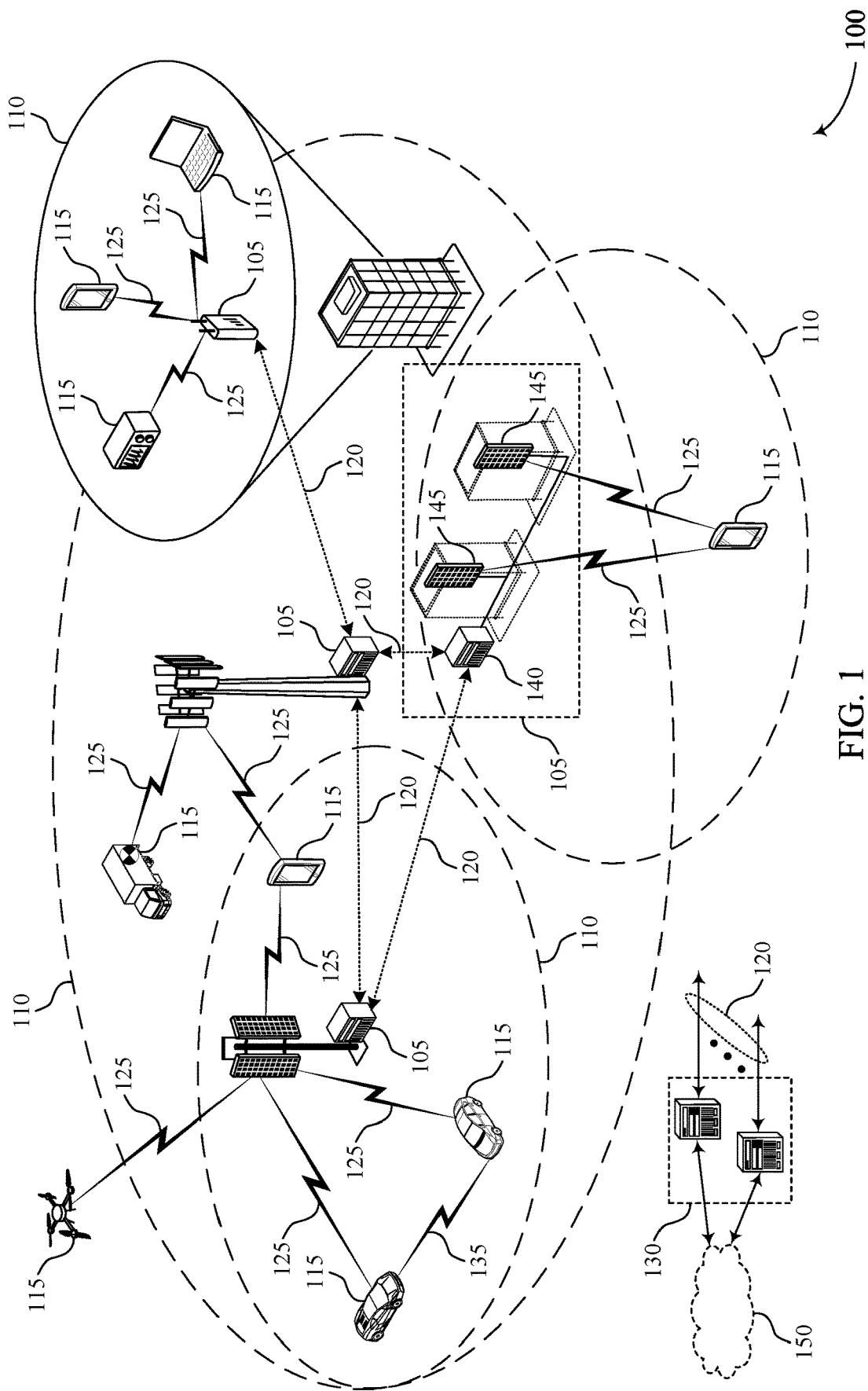
FIG. 1 illustrates an example of a system for wireless communications that supports flexible implicit modulation and coding scheme indication in accordance with aspects of the present disclosure.

Radio access technologies are supporting increased usage of the radio frequency spectrum (e.g., mmW communication). The increased utilization of the radio frequency spectrum may result in higher modulation orders being used to encode/decode wireless communications. For example, radio access technologies may utilize binary phase shift keying (BPSK), quadrature phase shift keying (QPSK), 16 quadrature amplitude modulation (QAM), 64-QAM, 256-QAM, and 1024-QAM modulation orders. Devices may reference a modulation and coding scheme table to determine various modulation orders, coding rates, etc. for transmissions. The table may include explicit modulation and coding scheme entries and implicit modulation and coding scheme entries. The explicit modulation and coding scheme entries may define both a modulation order and a target code rate. Conversely, an implicit modulation and coding scheme entry may define the modulation order without defining a target code rate (or a spectral efficiency). Implicit modulation and coding scheme entries may indicate that the transmission uses the transport block size calculated from a latest physical downlink control channel (PDCCH) using an explicit modulation and coding scheme entry for the transport block. As such, implicit modulation and coding scheme entries may be utilized for retransmissions of transport blocks, and devices may calculate the target code rate based on the transport block size and explicit modulation and coding scheme entry corresponding to a previous or initial transmission of the transport block.

A table with four or more modulation orders may include a relatively large amount of implicit modulation and coding scheme entries, which may reduce the number of explicit modulation and coding scheme entries. As an example, as the number of implicit modulation and coding scheme entries in a table of fixed size increases, the table has less room for explicit modulation and coding scheme entries. As a result of limited explicit modulation and coding scheme entries, the number of modulation and coding scheme allocation combinations that may be used on a first transmission to achieve a target transport block size may be limited. To accommodate the increase in the number of modulation orders without reducing the number of explicit modulation and coding scheme entries, a wireless communications system may utilize a flexible modulation and coding scheme indications, as described herein.

Particular aspects of the subject matter described herein may be implemented to realize one or more advantages. The described techniques may support improvements in the modulation and coding scheme indication framework, decreasing signaling overhead, and improving reliability, and conserving memory resources, among other advantages. As such, supported techniques may include improved network operations and, in some examples, may promote network efficiencies, among other benefits.

Aspects of the disclosure are initially described in the context of wireless communications systems. Aspects of the disclosure are further described with respect to a wireless communications system, example modulation and coding scheme tables, and a process flow diagram. Aspects of the disclosure are further illustrated by and described with reference to apparatus diagrams, system diagrams, and flowcharts that relate to flexible implicit modulation and coding scheme indication.

FIG. 1 illustrates an example of a wireless communications system 100 that supports flexible implicit modulation and coding scheme indication in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 and/or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a predefined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some cases, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a base station 105 may select a modulation and coding scheme for communications with a UE 115. The base station 105 may indicate the selected modulation and coding scheme via a modulation and coding scheme index, which corresponds to a modulation and coding scheme table. The modulation and coding scheme table may include information such as modulation and coding scheme indices, modulation orders, target code rates, and spectral efficiencies (which may be determined based on the modulation order and target code rate). The table may include explicit modulation and coding scheme entries and implicit modulation and coding scheme entries. The explicit modulation and coding scheme entries may define both a modulation order and a target code rate. Conversely, an implicit modulation and coding scheme entry may define the modulation order without defining a target code rate (or a spectral efficiency). Implicit modulation and coding scheme entries may indicate that the transmission uses the transport block size calculated from the latest PDCCH using an explicit modulation and coding scheme entry for the transport block. As such, implicit modulation and coding scheme entries may be utilized for retransmissions of transport blocks, and UE 115 may calculate the target code rate based on the transport block size and explicit modulation and coding scheme entry corresponding to a previous or initial transmission of the transport block. For downlink, semi-persistent scheduling (DL-SPS) and uplink configured grant (ULCG) type 1, the previous or initial modulation and coding scheme could have been indicated in an activation downlink control information (DCI). For ULCG type 2, the modulation and coding scheme index from radio resource control signaling may be used.

As more of the radio frequency spectrum is being utilized (e.g., mmW communication), higher modulation orders may be employed for communication. For example, radio access technologies may utilize QPSK, 16-QAM, 64-QAM, 256-QAM, and 1024-QAM modulation orders. A table with four or five modulation orders may include a relatively large amount of implicit modulation and coding scheme entries, which may reduce the number of explicit modulation and coding scheme entries. As a result of limited explicit modulation and coding scheme entries, the number of modulation and coding scheme allocation combinations that may be used on a first transmission to achieve a target transport block size may be limited. To accommodate the increase in the number of modulation orders without reducing the number of explicit modulation and coding scheme entries, various devices (e.g., base station 105 and/or UE 115) of wireless communications system 100 may utilize a flexible modulation and coding scheme indication, as described herein.

In one example of a flexible modulation and coding scheme indication, a modulation and coding scheme entry in a table may include multiple modulation orders. The utilization of multiple modulation orders in a modulation and coding scheme entry may allow for a reduced number of implicit modulation and coding scheme entries, which may result in additional explicit modulation and coding scheme entries. For example, a modulation and coding scheme entry corresponding to modulation and coding scheme index 28 may indicate modulation orders of both QPSK and 16-QAM. When such a modulation and coding scheme index is indicated, the choice of the modulation order used for a given transmission may be determined dynamically. In some cases, the modulation order is selected from two modulation orders indicated by a modulation and coding scheme entry may be determined based on an earlier transmission of a transport block. For example, if the prior modulation order for the prior transmission of the transport block is below a predetermined order (e.g., below a threshold), then the first modulation order of the entry may be used for decoding/encoding a transport block. If the prior modulation order is equal to or above the threshold, then the second modulation order of the entry may be used for decoding/encoding a transport block.

The determination of the modulation order of the earlier transmission may be based on a DCI signal scheduling the latest transmission of the transport block, from the downlink control information signal scheduling the latest transmission of the transport block using an explicit modulation and coding scheme, or from the downlink control information signal scheduling the first (or first detected) transmission of the transport block. For downlink semi-persistent scheduling or uplink configured grant type 2 (downlink control information activated), determination of the modulation order using the downlink control information scheduling the first (or first detected) transmission of the transport block may be based on the activation downlink control information signal. For uplink configured grant type 1 (RRC activated), the determination of the modulation order using the downlink control information scheduling the first (or first detected) transmission of the transport block may be based on the radio resource control configuration.

In some cases, a flexible modulation and coding scheme indication may include a modulation and coding scheme table defining the difference between the modulation order and a reference modulation order. For example, for a prior transmission with a modulation of 1024 QAM, a modulation and coding scheme entry may indicate a modulation order of "−3," which may correspond to a 16-QAM modulation order. This technique may be referred to as a differential indication of the modulation order.

Flexible modulation and coding scheme indications may be utilized to leverage a limited amount of resources allocated for a modulation and coding scheme table to indicate various different modulation orders. Further, the modulation orders may be determined based on prior transmissions of a transport block. Accordingly, these techniques may be used without significantly increasing resources allocated for a modulation and coding scheme table.

Figure 2:
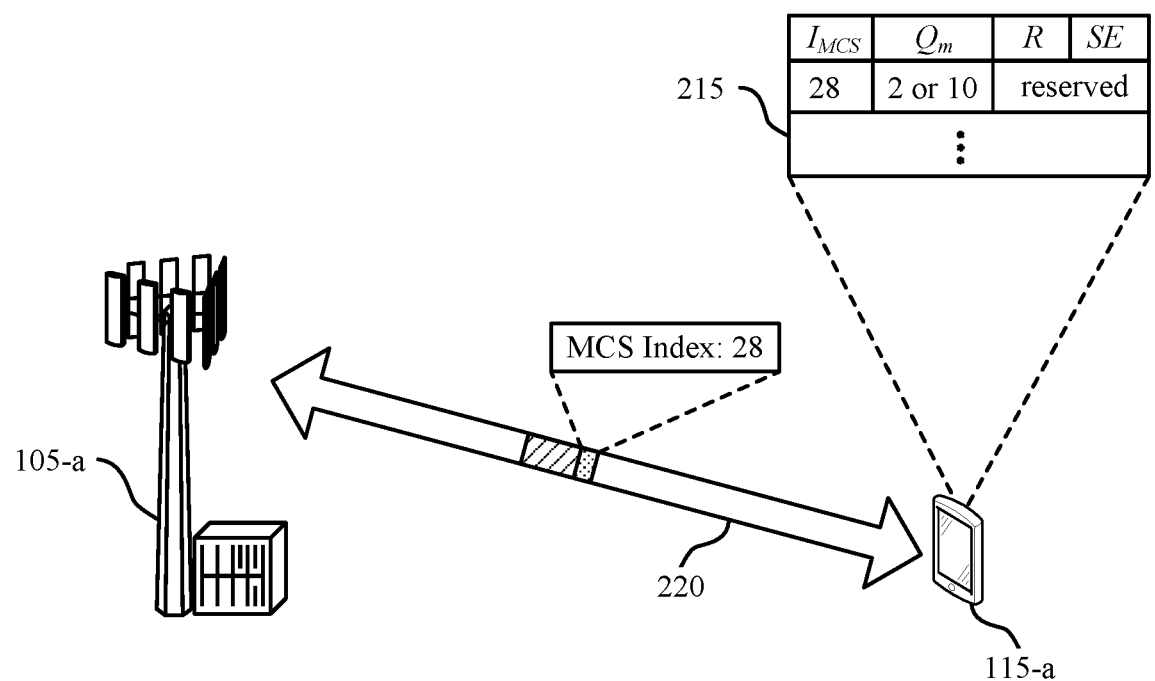
FIG. 2 illustrates an example of a wireless communications system that supports flexible implicit modulation and coding scheme indication in accordance with aspects of the present disclosure.

FIG. 2 illustrates an example of a wireless communications system 200 that supports flexible implicit modulation and coding scheme indication in accordance with aspects of the present disclosure. In some examples, wireless communications system 200 may implement aspects of wireless communications system 100. The wireless communications system 200 includes a base station 105-*a* and a UE 115-*a*, which may be examples of the corresponding devices of FIG. 1. The base station 105-*a* and the UE 115-*a* may communicate over a communication link 220. The communication link 220 may be utilized to communicate downlink and uplink communications over various resources.

In FIG. 2, a transport block 205 may be communicated between the base station 105-*a* and the UE 115-*a*. The transport block 205 may be an uplink communication or a downlink communication. The base station 105-*a* may also transmit a modulation and coding scheme index indication 210 corresponding to the transport block 205. In an uplink scenario, the modulation and coding scheme index may correspond to a modulation order for encoding the transport block 205, which may then be communicated to the base station 105-*a*. In a downlink scenario, the UE 115-*a* may receive the modulation and coding scheme index indication 210 and the transport block 205 from the base station and decode the transport block 205 based on a modulation order corresponding to the modulation and coding scheme index indication. In some cases, the transport block 205 is a retransmission of a previously transmitted transport block.

To determine a modulation order corresponding to the modulation and coding scheme index indication 210, the UE 115-a may reference a modulation and coding scheme table 215. The entry in the modulation and coding scheme table for modulation and coding scheme index 28 may be an implicit modulation and coding scheme entry and include two modulation orders: 2 or 10 (in the example of FIG. 2). In some cases, the modulation order values in a modulation and coding scheme table may correspond to specific modulation orders. For example, modulation order 2 may correspond to QPSK, modulation order 4 may correspond to 16-QAM, modulation order 6 may correspond to 64-QAM, modulation order 8 may correspond to 256-QAM, and modulation order 10 may correspond to 1024-QAM. To determine whether to use modulation order 2 or 10 to encode or decode the transport block 205, the UE 115-a may reference a prior modulation order associated with a prior transmission of the transport block 205. In some examples, the prior transmission may be a most recent prior transmission of the transport block transmitted with a modulation and coding scheme index that corresponds to a single modulation order. Based on the prior modulation order, the UE 115-a may select modulation order 2 or 10 for encoding or decoding the transport block. For example, if the prior modulation order is above a prior modulation order threshold, then the UE 115-a may select the second modulation order in the entry (e.g., modulation order 10). Conversely, if the prior modulation order is below the prior modulation order threshold, then the UE 115-a may select the first modulation order in the entry (e.g., modulation order 2).

In some cases, one or more entries in a modulation and coding scheme table may include more than two sets of modulation orders. In such cases, more than one threshold may be defined to accommodate more than two sets of modulation orders. In one example, the determination of the modulation order of the prior transmission is based on a control signal (e.g., DCI or RRC) scheduling the latest or prior transmission of the transport block. In another example, the determination of the modulation order of the prior transmission is based on the control signal (e.g., DCI or RRC) scheduling the latest or prior transmission of the transport block that uses an explicit modulation and coding scheme entry. In yet another example, the determination of the prior modulation order is based on the control signal (e.g., DCI or RRC) scheduling the first (or first detected) transmission of the transport block. To identify the DCI scheduling the first (or first detected) transmission of the transport block for DL-SPS or uplink (UL) configured grant type 2 (e.g., DCI activated), the UE 115-a may utilize the activation DCI. To identify the DCI scheduling the first (or first detected) transmission of the transport block for UL configured grant type 1 (e.g., RRC activated), the UE 115-a may utilize the RRC configuration.

After identifying the prior modulation order of the prior transmission, the UE 115-a determines the modulation order for the transport block 205 using the prior modulation order and the modulation and coding scheme entry. The UE 115-a may process the transport block 205 based on the determined modulation order. Processing the transport block 205 may include decoding the received transport block 205 or encoding the transport block 205 for transmission to the base station 105-a.

In one example, at least a subset of modulation orders may have implicit modulation and coding scheme entries. For example, 1024-QAM may not include a corresponding implicit modulation and coding scheme entry since a transmission of a transport block with a 1024-QAM may have a lower modulation order. In some cases, the modulation sets (e.g., sets per entry or configuration per entry), modulation threshold, and reference transmission definition may be predefined at the devices (e.g., base station 105-a and UE 115-a) or may be configured via RRC signaling (e.g., jointly or independently). For example, a base station 105-a may configure the definition of the prior transmission and the threshold via RRC signaling.

FIG. 3 illustrates examples of modulation and coding scheme tables 300 that support flexible implicit modulation and coding scheme indication in accordance with aspects of the present disclosure. In some examples, modulation and coding scheme tables 300 may be implemented by aspects of wireless communications system 100. The modulation and coding scheme tables 300 may be utilized by various devices of FIGS. 1 and 2 including UEs 115 and base stations 105. For example, a base station 105 may indicate a modulation and coding scheme index ($I_{MCS}$) for a transport block, and a UE 115 may reference one of the modulation and coding scheme tables for determining a modulation order for processing the transport block. If an entry includes more than one modulation order, then the UE 115 may determine the respective modulation order for an entry based at least in part on a prior modulation order of a prior transmission of the transport block. The modulation and coding scheme tables may support QPSK (2), 16-QAM (4), 64-QAM (6), 256-QAM (8), and 1024-QAM (10). The techniques described herein may be utilized for more modulation orders. Further, each modulation and coding scheme table 300 may partially illustrate a modulation and coding scheme table, as each modulation and coding scheme table 300 may include additional entries (e.g., implicit and explicit) which may not be illustrated. Further, the example modulation and coding scheme tables 300 illustrate two modulation orders in various entries, but it should be understood that an entry may include more than two modulation orders. Further, the orders indicated by various entries may not be consecutive.

Modulation and coding scheme table 300-a includes four implicit modulation and coding scheme entries, where each consecutive entry is shifted by one modulation order. For example, modulation and coding scheme index 28 corresponds to a modulation order of 2 or 4, while modulation and coding scheme index 29 corresponds to a modulation order of 4 or 6. Modulation and coding scheme table 300-b includes four implicit modulation and coding scheme entries, with one min-max flexible entry 305. Modulation and coding scheme table 300-c includes three implicit modulation and coding scheme entries, where each consecutive entry is shifted by two modulation orders. Modulation and coding scheme table 300-d includes four implicit modulation and coding scheme entries with one flexible entry. Modulation and coding scheme table 300-d is an alternative representation of a modulation and coding scheme table with columns for each modulation order for the entries. It should be understood that various features of one or more of the modulation and coding scheme tables 300 may be implemented.

In one example, using modulation and coding scheme table 300-a, a threshold modulation is 256-QAM and a reference transmission (e.g., a prior transmission) used 1024-QAM. The UE 115 receives an index of 28. Since, the reference transmission used a modulation order above the threshold, then the current transmission uses 16-QAM (e.g., 4). In another example, using modulation and coding scheme table 300-a, the reference transmission using a modulation order of 64-QAM, and the threshold modulation order is 256-QAM. The UE 115 receives a modulation and coding scheme index of 28. Since the modulation order of the prior transmission is below the threshold, then the current transmission uses a modulation order of QPSK (e.g., 2).

FIG. 4 illustrates examples of modulation and coding scheme tables 400 that support flexible implicit modulation and coding scheme indication in accordance with aspects of the present disclosure. In some examples, modulation and coding scheme tables 400 may implement aspects of wireless communications system 100. The modulation and coding scheme tables 400 may be utilized by various devices of FIGS. 1 and 2 including UEs 115 and base stations 105. For example, a base station 105 may indicate a modulation and coding scheme index for a transport block, and a UE 115 may reference one of the modulation and coding scheme tables for determining a modulation order for processing the transport block. If an entry includes a differential modulation order, then the UE 115 may determine the respective modulation order for an entry based at least in part on a prior modulation order of a prior transmission of the transport block. The modulation and coding scheme tables may support QPSK, 16-QAM, 64-QAM, 256-QAM, and 1024-QAM. The techniques described herein may be utilized for more modulation orders. Further, each modulation and coding scheme table 400 may partially illustrate a modulation and coding scheme table, as each modulation and coding scheme table 400 may include additional entries (e.g., implicit and explicit) which may not be illustrated.

Modulation and coding scheme tables 400 may include differential entries that define the difference between the modulation order and a modulation order of a prior transmission of a transport block. For example, if a reference modulation order (e.g., a modulation order of a prior transmission of the transport block) is 1024-QAM, then $Q_m=-3$ (e.g., modulation and coding scheme index 28 of modulation and coding scheme table 400-$a$), indicates a 16-QAM modulation order. If there is an underflow (e.g., prior modulation order is 16-QAM and an entry includes a value of –3), then the device may default to the minimum modulation order (e.g., QPSK). In other cases, the device may cycle back through the modulation orders. For example, if the reference modulation order is 16-QAM and the entry indicates –3, then the device may determine to use a modulation order of 256-QAM, if the system supports The modulation and coding scheme tables may support QPSK, 16-QAM, 64-QAM, 256-QAM, and 1024-QAM. Further, a modulation and coding scheme table 400 may include multiple differential entries, and the device may determine which differential to use based on a threshold order and the prior modulation order (e.g., as described with respect to FIG. 3).

Figure 5:
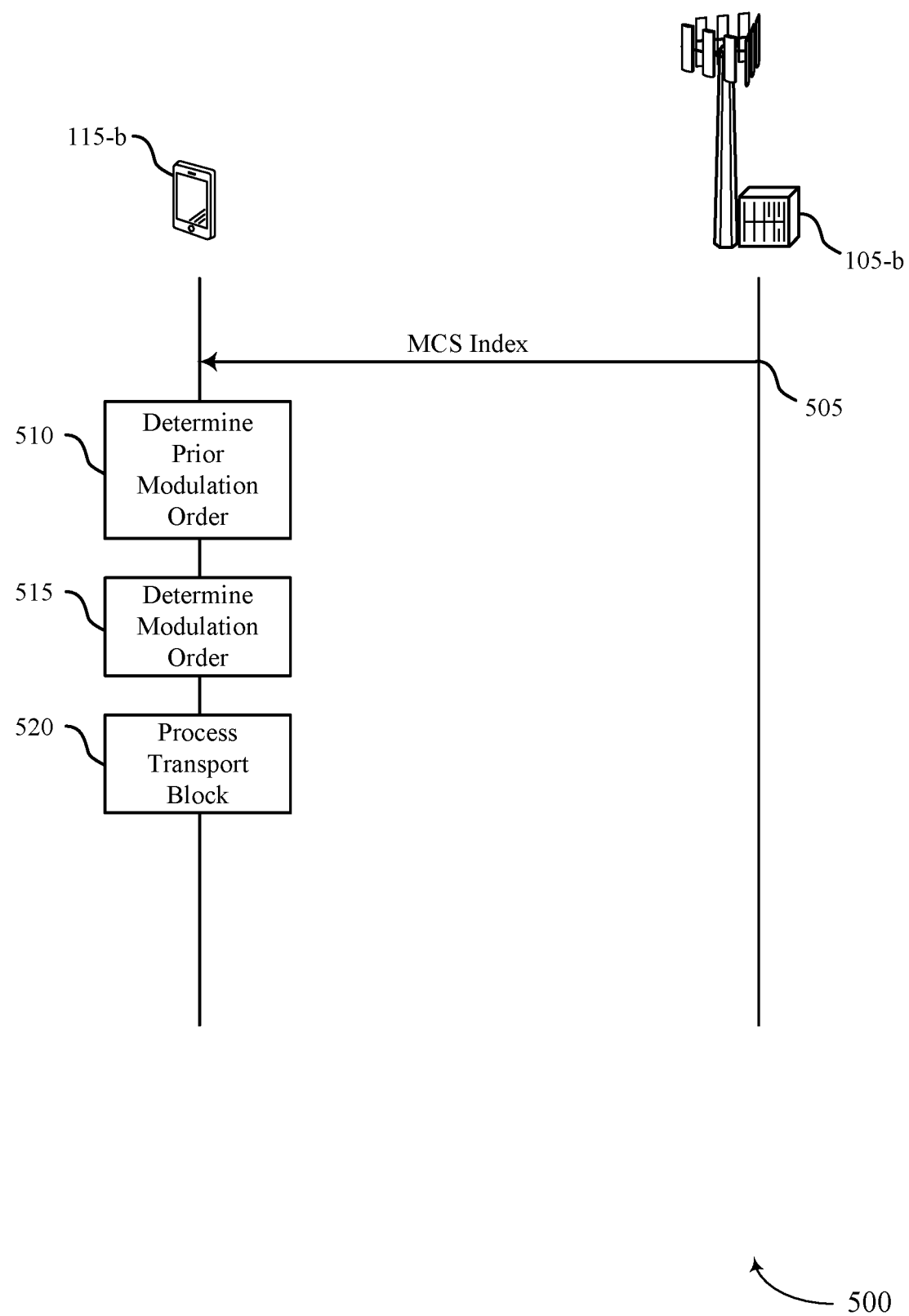
FIG. 5 illustrates an example of a process flow that supports flexible implicit modulation and coding scheme indication in accordance with aspects of the present disclosure.

FIG. 5 illustrates an example of a process flow 500 that supports flexible implicit modulation and coding scheme indication in accordance with aspects of the present disclosure. In some examples, process flow 500 may implement aspects of wireless communications system 100. The process flow 500 includes a UE 115-$b$ and a base station 105-$b$, which may be examples of the corresponding devices of FIGS. 1 and 2. The UE 115-$b$ and base station 105-$b$ may implement flexible implicit modulation and coding scheme indications, as described herein. In some cases, the UE 115-$b$ and the base station 105-$b$ may reference a modulation and coding scheme table with multiple modulation orders for one more entries in the tale, a modulation and coding scheme table with one or more differential indications for one or more entries in the table, or a combination thereof.

At 505, the base station 105-$b$ transmits an indication of a modulation and coding scheme index to be applied to encoding or decoding of a transport block. The modulation and coding scheme index may be associated with two modulation orders or a differential indication of a modulation order.

At 510, the UE 115-$b$ determines a prior modulation of a prior transmission of the transport block. The prior modulation order may be determined based on a control signal (e.g., DCI or RRC) scheduling a prior transmission of the transport block. In some cases, the UE 115-$b$ uses, as the prior transmission, a most recent prior transmission of the transport block transmitted with a modulation and coding scheme index that corresponds to a single modulation order. In some cases, the UE 115-$b$ uses the prior transmission of the transport block that utilizes an explicit modulation and coding scheme entry. In other cases, the UE 115-$b$ considers the DCI scheduling the first or first detected transmission of the transport block.

At 515, the UE 115-$a$ determines a modulation order of the at least two modulation orders based at least in part on a prior modulation order associated with a prior transmission of the transport block. In some cases, the modulation order based at least in part on the differential indication and a prior modulation order associated with a prior transmission of the transport block.

At 520, the UE 115-$b$ process the transport block by encoding or decoding the transport block based at least in part on the determined modulation order. For example, if the determined modulation order is associated with a received transport block, then the UE 115-$a$ may determine the modulation order for decoding the received the transport block. In another example, if the determined modulation order is associated with a transport block scheduled for transmission, then the determined modulation order may be used to encode the transport block.

Figure 6:
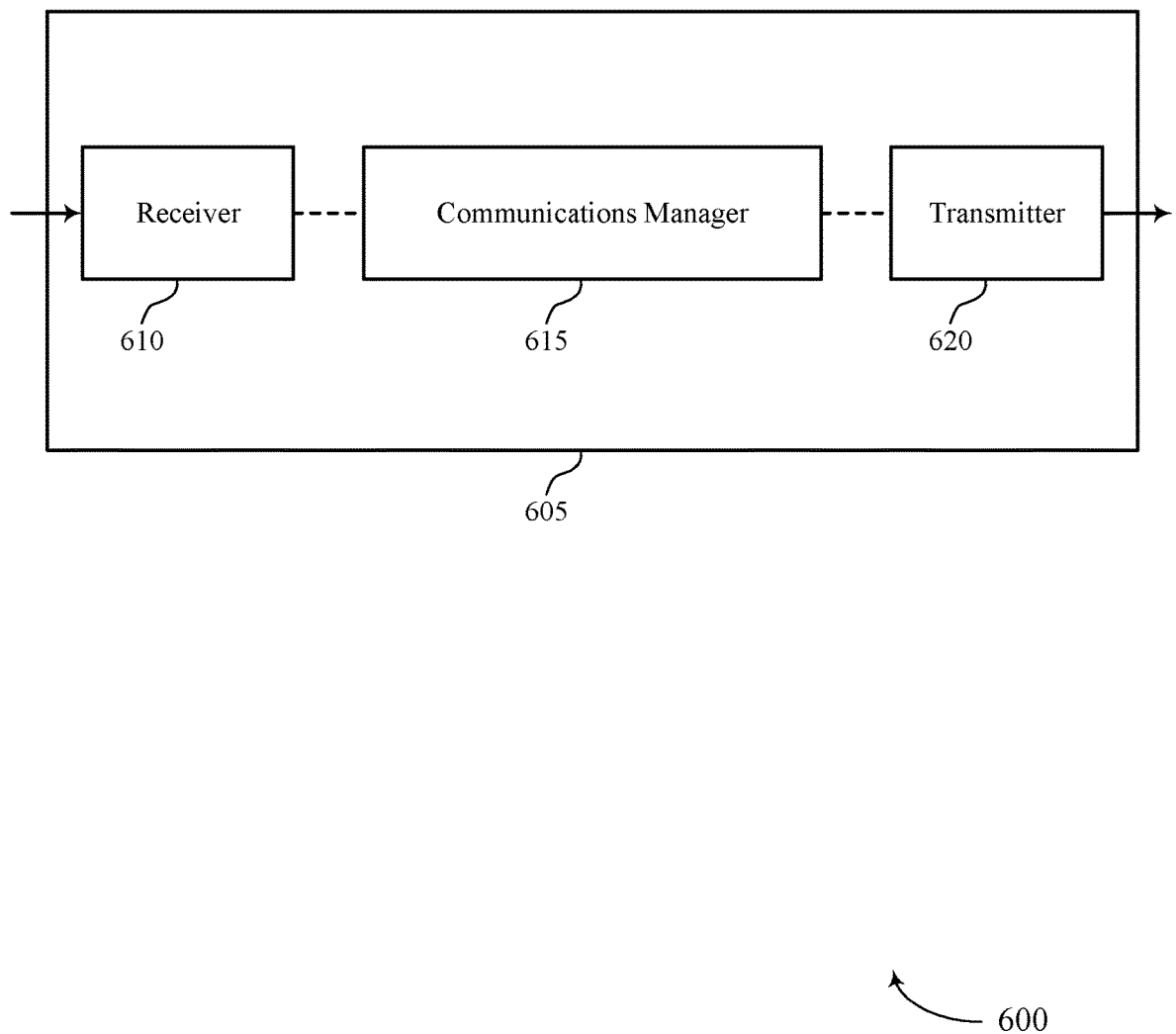
FIGS. 6 and 7 show block diagrams of devices that support flexible implicit modulation and coding scheme indication in accordance with aspects of the present disclosure.

FIG. 6 shows a block diagram 600 of a device 605 that supports flexible implicit modulation and coding scheme indication in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to flexible implicit modulation and coding scheme indication, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station, an indication of a modulation and coding scheme index to be applied to encoding or decoding of a transport block, where the modulation and coding scheme index is associated with at least two modulation orders, determine a modulation order of the at least two modulation orders based on a prior modulation order associated with a prior transmission of the transport block, and process the transport block by encoding or decoding the transport block based on the determined modulation order. The communications manager 615 may also receive, from a base station, an indication of a modulation and coding scheme index to be applied to encoding or decoding of a transport block, where the modulation and coding scheme index is associated with a differential indication of a modulation order, determine a modulation order for encoding or decoding the transport block based on the differential indication and a prior modulation order associated with a prior transmission of the transport block, and process the transport block by encoding or decoding the transport block based on the determined modulation order. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the communications manager 615 may be implemented as an integrated circuit or chipset for a mobile device modem, and the receiver 610 and transmitter 620 may be implemented as analog components (e.g., amplifiers, filters, antennas) coupled with the mobile device modem to enable wireless transmission and reception over one or more bands.

The communications manager 615 as described herein may be implemented to realize one or more potential advantages. One implementation may allow the device 605 to more efficiently determine modulation orders to utilize and store modulation and coding scheme information. For example, the device 605 may store more information in a modulation and coding scheme table with a limited resource allocated.

Based on implementing the flexible modulation and coding scheme indication techniques as described herein, a processor of a UE 115 (e.g., controlling the receiver 610, the transmitter 620, or the transceiver 920 as described with reference to FIG. 9) may increase reliability and efficiency of processing transport blocks because the modulation order of a large number of possible modulation orders may be implicitly indicated to the UE 115 based on a prior modulation order.

Figure 7:
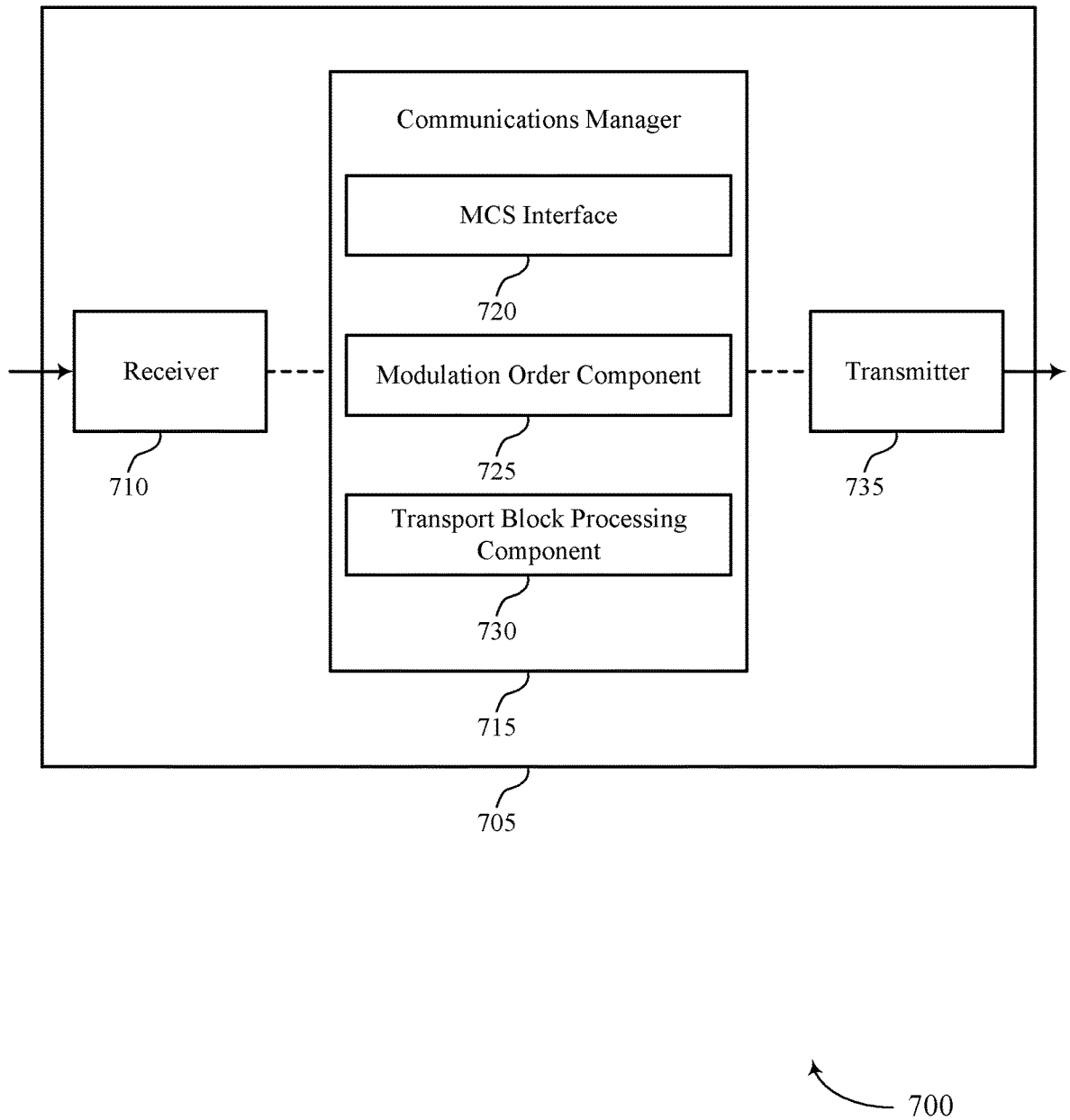

FIG. 7 shows a block diagram 700 of a device 705 that supports flexible implicit modulation and coding scheme indication in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to flexible implicit modulation and coding scheme indication, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a modulation and coding scheme interface 720, a modulation order component 725, and a transport block processing component 730. The communications manager 715 may be an example of aspects of the communications manager 910 described herein.

The modulation and coding scheme interface 720 may receive, from a base station, an indication of a modulation and coding scheme index to be applied to encoding or decoding of a transport block, where the modulation and coding scheme index is associated with at least two modulation orders.

The modulation order component 725 may determine a modulation order of the at least two modulation orders based on a prior modulation order associated with a prior transmission of the transport block.

The transport block processing component 730 may process the transport block by encoding or decoding the transport block based on the determined modulation order.

The modulation and coding scheme interface 720 may receive, from a base station, an indication of a modulation and coding scheme index to be applied to encoding or decoding of a transport block, where the modulation and coding scheme index is associated with a differential indication of a modulation order.

The modulation order component 725 may determine a modulation order for encoding or decoding the transport block based on the differential indication and a prior modulation order associated with a prior transmission of the transport block. The transport block processing component 730 may process the transport block by encoding or decoding the transport block based on the determined modulation order.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
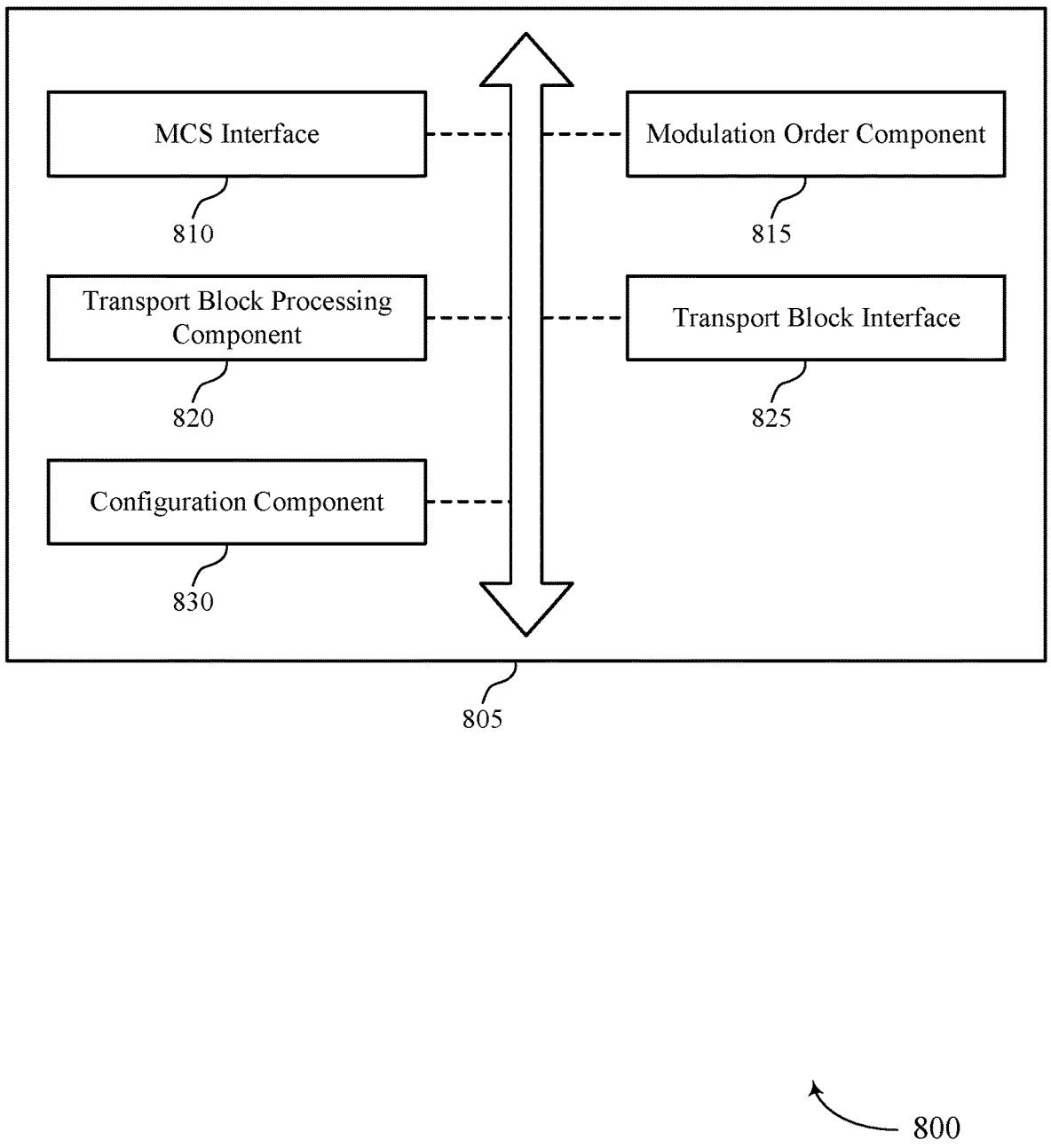
FIG. 8 shows a block diagram of a communications manager that supports flexible implicit modulation and coding scheme indication in accordance with aspects of the present disclosure.

FIG. 8 shows a block diagram 800 of a communications manager 805 that supports flexible implicit modulation and coding scheme indication in accordance with aspects of the present disclosure. The communications manager 805 may be an example of aspects of a communications manager 615, a communications manager 715, or a communications manager 910 described herein. The communications manager 805 may include a modulation and coding scheme interface 810, a modulation order component 815, a transport block processing component 820, a transport block interface 825, and a configuration component 830. Each of these modules may communicate, directly or indirectly, with one another (e.g., via one or more buses).

The modulation and coding scheme interface 810 may receive, from a base station, an indication of a modulation and coding scheme index to be applied to encoding or decoding of a transport block, where the modulation and coding scheme index is associated with at least two modulation orders.

In some examples, the modulation and coding scheme interface 810 may receive, from a base station, an indication of a modulation and coding scheme index to be applied to encoding or decoding of a transport block, where the modulation and coding scheme index is associated with a differential indication of a modulation order.

The modulation order component 815 may determine a modulation order of the at least two modulation orders based on a prior modulation order associated with a prior transmission of the transport block. In some examples, the prior transmission may be a most recent prior transmission of the transport block transmitted with a modulation and coding scheme index that corresponds to a single modulation order.

In some examples, the modulation order component 815 may determine a modulation order for encoding or decoding the transport block based on the differential indication and a prior modulation order associated with a prior transmission of the transport block.

In some examples, the modulation order component 815 may compare the prior modulation order to a modulation order threshold. In some examples, the modulation order component 815 may determine the modulation order based on the comparing.

In some examples, the modulation order component 815 may determine the prior modulation order in accordance with a control signal scheduling the prior transmission of the transport block, where the prior transmission of the transport block is a most recent transmission of the transport block.

In some examples, the modulation order component 815 may determine the prior modulation order in accordance with a control signal scheduling the prior transmission of the transport block, where the prior transmission is a first detected transmission of the transport block. In some examples, the modulation order component 815 may compare the prior modulation order to a modulation order threshold. In some examples, the modulation order component 815 may determine the differential indication of the at least two differential indications based on the comparing.

In some examples, the modulation order component 815 may identify the modulation order as a minimum modulation order of a modulation and coding scheme index table based on the differential indication and the prior modulation order. In some examples, the modulation order component 815 may identify the modulation order from a modulation and coding scheme index table based on the differential indication and the prior modulation order, where the differential indication specifies a higher modulation and coding scheme index than the modulation and coding scheme index associated with the prior transmission.

In some examples, the modulation order component 815 may determine the prior modulation order in accordance with a control signal scheduling the prior transmission of the transport block, where the prior transmission of the transport block is a most recent transmission of the transport block.

In some examples, the modulation order component 815 may determine the prior modulation order in accordance with a control signal scheduling a first detected transmission of the transport block.

In some cases, the control signal indicates a modulation and coding scheme index associated with a target code rate for the most recent transmission of the transport block. In some cases, the control signal includes an activation downlink control information transmission. In some cases, the control signal includes a radio resource control transmission.

In some cases, the modulation and coding scheme index is associated with the at least two modulation orders in accordance with a modulation and coding scheme table, where each modulation and coding scheme index of the modulation and coding scheme table is associated with at least two modulation orders.

In some cases, the modulation and coding scheme index is associated with the at least two modulation orders in accordance with a modulation and coding scheme table, where at least a subset of modulation and coding scheme indices of the modulation and coding scheme table is associated with at least two modulation orders.

In some cases, each modulation and coding scheme index associated with a modulation order of a modulation and coding scheme index table includes an indication of a target code rate. In some cases, the control signal indicates a modulation and coding scheme index associated with a target code rate. In some cases, the control signal includes an activation downlink control information transmission. In some cases, the control signal includes a radio resource control transmission.

The transport block processing component 820 may process the transport block by encoding or decoding the transport block based on the determined modulation order. In some examples, the transport block processing component 820 may process the transport block by encoding or decoding the transport block based on the determined modulation order.

In some examples, the transport block processing component 820 may encode the transport block in accordance with the determined modulation order. In some examples, the transport block processing component 820 may decode the encoded transport block in accordance with the determined modulation order.

In some examples, the transport block processing component 820 may encode the transport block in accordance with the determined modulation order. In some examples, the transport block processing component 820 may decode the transport block in accordance with the determined modulation order.

The transport block interface 825 may transmit the encoded transport block to the base station. In some examples, the transport block interface 825 may receive the transport block encoded in accordance with the determined modulation order.

In some examples, the transport block interface 825 may transmit the encoded transport block to the base station. In some examples, the transport block interface 825 may receive the transport block encoded in accordance with the determined modulation order.

In some examples, the at least two modulation orders, an identification of the prior transmission, a modulation order threshold, or a combination thereof are predefined at the UE. In some examples, the configuration component 830 may receive a radio resource control signal indicating the at least two modulation orders, an identification of the prior transmission, a modulation order threshold, or a combination thereof.

In some examples, the differential indication, the prior modulation order, or a combination thereof are predefined at the UE. In some examples, the configuration component 830 may receive, from the base station, a radio resource control signal indicating the differential indication, the prior modulation order, or a combination thereof.

Figure 9:
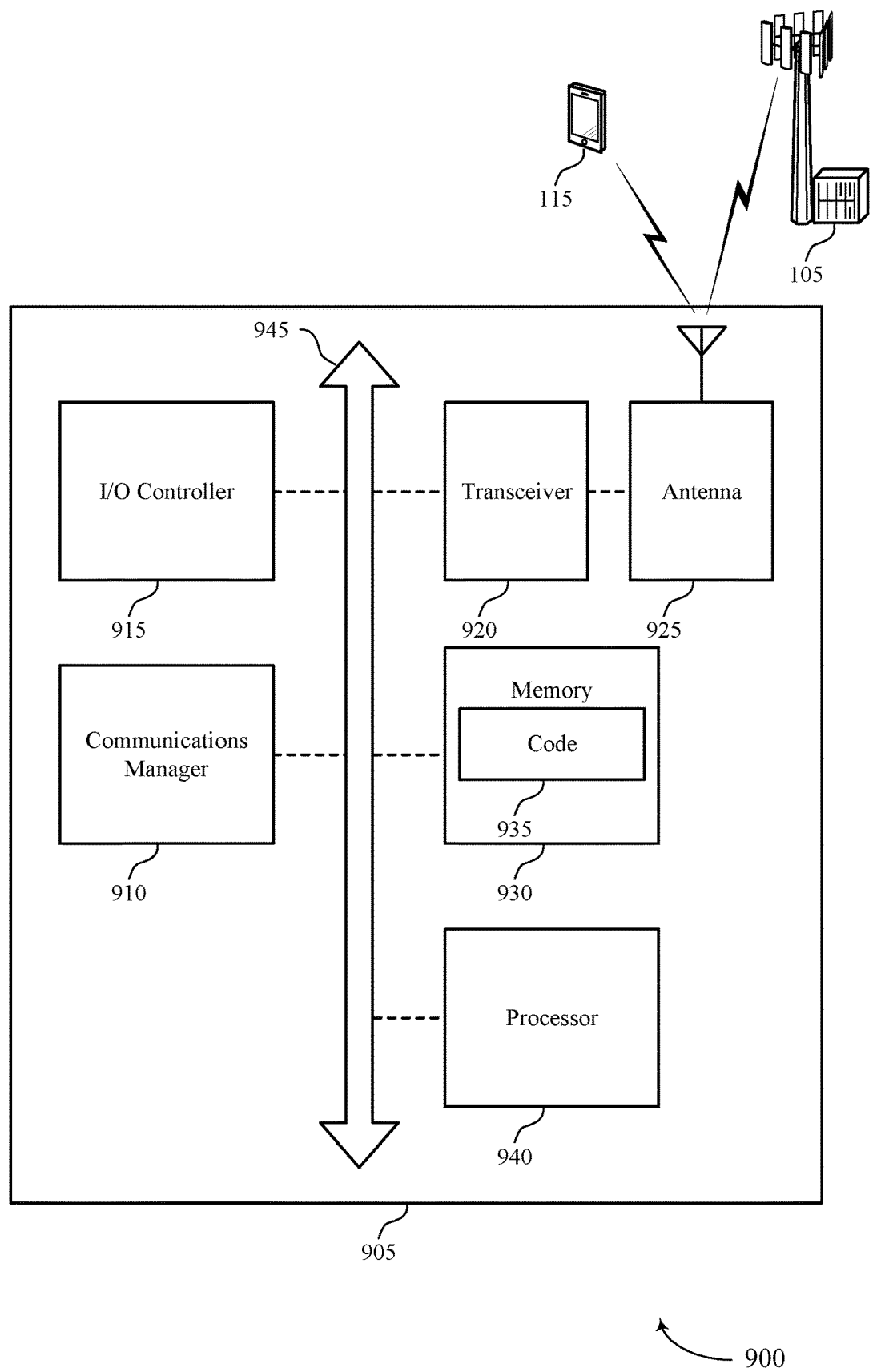
FIG. 9 shows a diagram of a system including a device that supports flexible implicit modulation and coding scheme indication in accordance with aspects of the present disclosure.

FIG. 9 shows a diagram of a system 900 including a device 905 that supports flexible implicit modulation and coding scheme indication in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, an indication of a modulation and coding scheme index to be applied to encoding or decoding of a transport block, where the modulation and coding scheme index is associated with at least two modulation orders, determine a modulation order of the at least two modulation orders based on a prior modulation order associated with a prior transmission of the transport block, and process the transport block by encoding or decoding the transport block based on the determined modulation order. The communications manager 910 may also receive, from a base station, an indication of a modulation and coding scheme index to be applied to encoding or decoding of a transport block, where the modulation and coding scheme index is associated with a differential indication of a modulation order, determine a modulation order for encoding or decoding the transport block based on the differential indication and a prior modulation order associated with a prior transmission of the transport block, and process the transport block by encoding or decoding the transport block based on the determined modulation order.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a digital signal processor (DSP), a CPU, a microcontroller, an ASIC, a field-programmable gate array (FPGA), a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting flexible implicit modulation and coding scheme indication).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
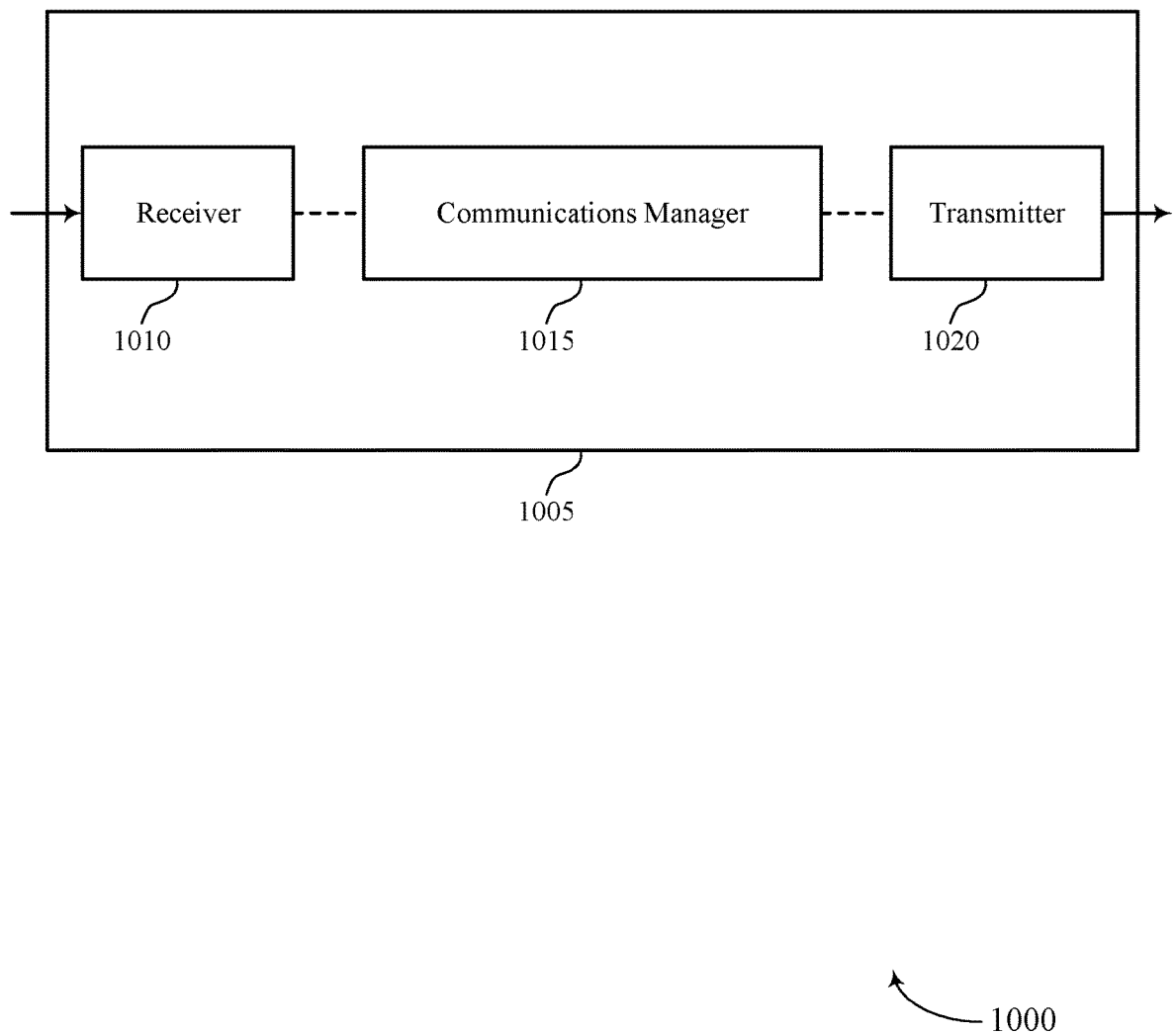
FIGS. 10 and 11 show block diagrams of devices that support flexible implicit modulation and coding scheme indication in accordance with aspects of the present disclosure.

FIG. 10 shows a block diagram 1000 of a device 1005 that supports flexible implicit modulation and coding scheme indication in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to flexible implicit modulation and coding scheme indication, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a UE, an indication of a modulation and coding scheme index to be applied to encoding or decoding of a transport block, where the modulation and coding scheme index is associated with at least two modulation orders, determine a modulation order of the at least two modulation orders based on a prior modulation order associated with a prior transmission of the transport block, and process the transport block by encoding or decoding the transport block based on the determined modulation order. The communications manager 1015 may also transmit, to a UE, an indication of a modulation and coding scheme index to be applied to encoding or decoding of a transport block, where the modulation and coding scheme index is associated with a differential indication of a modulation order, determine a modulation order for encoding or decoding the transport block based on the differential indication and a prior modulation order associated with a prior transmission of the transport block, and process the transport block by encoding or decoding the transport block based on the determined modulation order. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
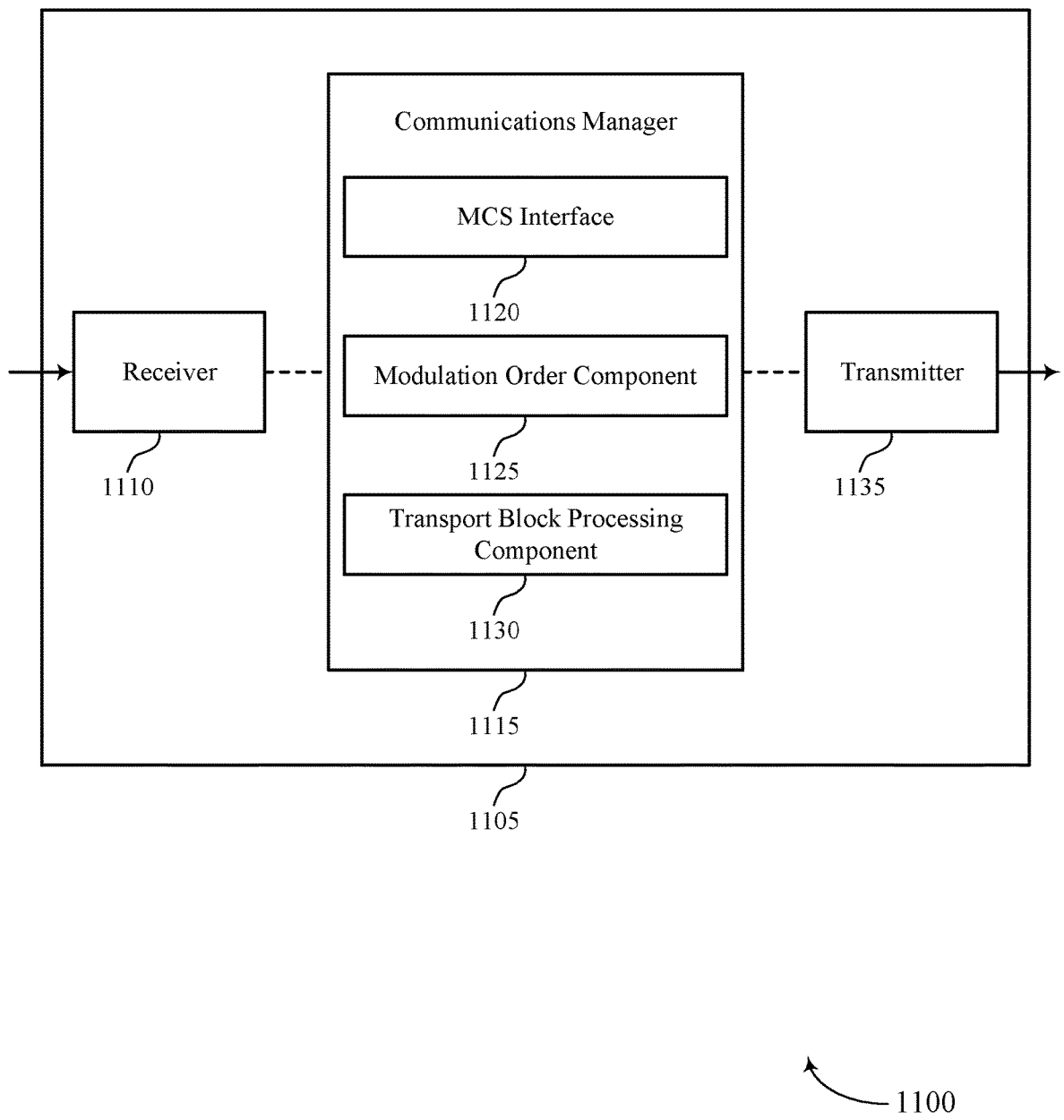

FIG. 11 shows a block diagram 1100 of a device 1105 that supports flexible implicit modulation and coding scheme indication in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to flexible implicit modulation and coding scheme indication, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a modulation and coding scheme interface 1120, a modulation order component 1125, and a transport block processing component 1130. The communications manager 1115 may be an example of aspects of the communications manager 1310 described herein.

The modulation and coding scheme interface 1120 may transmit, to a UE, an indication of a modulation and coding scheme index to be applied to encoding or decoding of a transport block, where the modulation and coding scheme index is associated with at least two modulation orders.

The modulation order component 1125 may determine a modulation order of the at least two modulation orders based on a prior modulation order associated with a prior transmission of the transport block. The transport block processing component 1130 may process the transport block by encoding or decoding the transport block based on the determined modulation order.

The modulation and coding scheme interface 1120 may transmit, to a UE, an indication of a modulation and coding scheme index to be applied to encoding or decoding of a transport block, where the modulation and coding scheme index is associated with a differential indication of a modulation order.

The modulation order component 1125 may determine a modulation order for encoding or decoding the transport block based on the differential indication and a prior modulation order associated with a prior transmission of the transport block.

The transport block processing component 1130 may process the transport block by encoding or decoding the transport block based on the determined modulation order.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
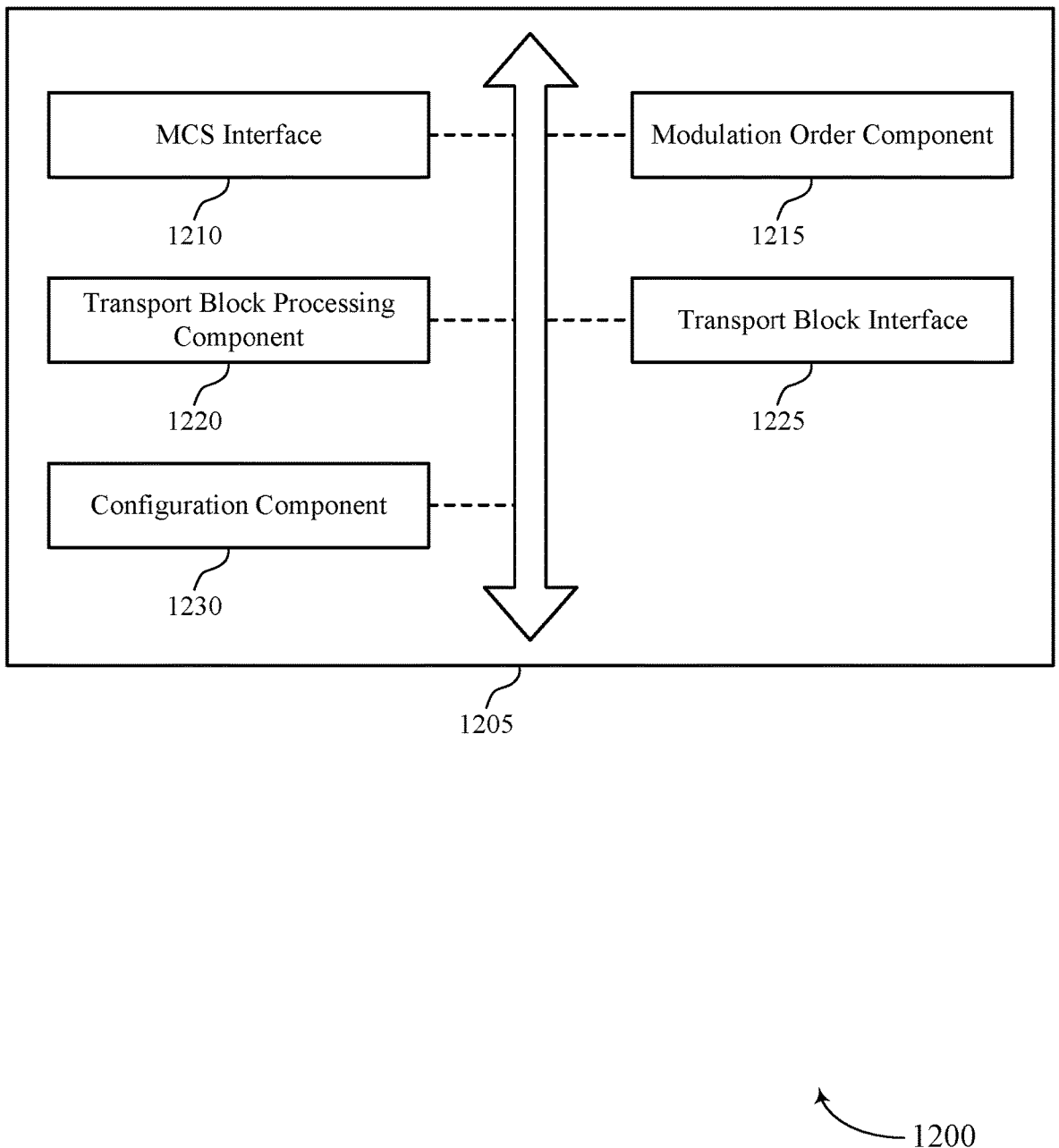
FIG. 12 shows a block diagram of a communications manager that supports flexible implicit modulation and coding scheme indication in accordance with aspects of the present disclosure.

FIG. 12 shows a block diagram 1200 of a communications manager 1205 that supports flexible implicit modulation and coding scheme indication in accordance with aspects of the present disclosure. The communications manager 1205 may be an example of aspects of a communications manager 1015, a communications manager 1115, or a communications manager 1310 described herein. The communications manager 1205 may include a modulation and coding scheme interface 1210, a modulation order component 1215, a transport block processing component 1220, a transport block interface 1225, and a configuration component 1230. Each of these modules may communicate, directly or indirectly, with one another (e.g., via one or more buses).

The modulation and coding scheme interface 1210 may transmit, to a UE, an indication of a modulation and coding scheme index to be applied to encoding or decoding of a transport block, where the modulation and coding scheme index is associated with at least two modulation orders.

In some examples, the modulation and coding scheme interface 1210 may transmit, to a UE, an indication of a modulation and coding scheme index to be applied to encoding or decoding of a transport block, where the modulation and coding scheme index is associated with a differential indication of a modulation order.

The modulation order component 1215 may determine a modulation order of the at least two modulation orders based on a prior modulation order associated with a prior transmission of the transport block. In some examples, the prior transmission may be a most recent prior transmission of the transport block transmitted with a modulation and coding scheme index that corresponds to a single modulation order.

In some examples, the modulation order component 1215 may determine a modulation order for encoding or decoding the transport block based on the differential indication and a prior modulation order associated with a prior transmission of the transport block.

In some examples, the modulation order component 1215 may compare the prior modulation order to a modulation order threshold. In some examples, the modulation order component 1215 may determine the modulation order based on the comparing. In some examples, the modulation order component 1215 may determine the prior modulation order in accordance with a transmitted control signal scheduling the prior transmission of the transport block, where the prior transmission of the transport block is a most recent transmission of the transport block.

In some examples, the modulation order component 1215 may determine the prior modulation order in accordance with a control signal scheduling the prior transmission of the transport block, where the prior transmission is a first detected transmission of the transport block.

In some examples, the modulation order component 1215 may compare the prior modulation order to a modulation order threshold. In some examples, the modulation order component 1215 may determine the differential indication of the at least two differential indications based on the comparing.

In some examples, the modulation order component 1215 may identify the modulation order as a minimum modulation order of a modulation and coding scheme index table based on the differential indication and the prior modulation order.

In some examples, the modulation order component 1215 may identify the modulation order from a modulation and coding scheme index table based on the differential indication and the prior modulation order, where the differential indication specifies a higher modulation and coding scheme index than the modulation and coding scheme index associated with the prior transmission.

In some examples, the modulation order component 1215 may determine the prior modulation order in accordance with a transmitted control signal scheduling the prior transmission of the transport block, where the prior transmission of the transport block is a most recent transmission of the transport block.

In some examples, the modulation order component 1215 may determine the prior modulation order in accordance with a transmitted control signal scheduling a first detected transmission of the transport block.

In some examples, the modulation order component 1215 may decode the encoded transport block in accordance with the determined modulation order. In some cases, the transmitted control signal indicates a modulation and coding scheme index associated with a target code rate for the prior transmission of the transport block. In some cases, the control signal includes an activation downlink control information transmission. In some cases, the control signal includes a radio resource control transmission.

In some cases, the modulation and coding scheme index is associated with the at least two modulation orders in accordance with a modulation and coding scheme table, where each modulation and coding scheme index of the modulation and coding scheme table is associated with at least two modulation orders.

In some cases, the modulation and coding scheme index is associated with the at least two modulation orders in accordance with a modulation and coding scheme table, where at least a subset of modulation and coding scheme indices of the modulation and coding scheme table is associated with at least two modulation orders.

In some cases, each modulation and coding scheme index associated with a modulation order of a modulation and coding scheme index table includes an indication of a target code rate. In some cases, the transmitted control signal indicates a modulation and coding scheme index associated with a target code rate. In some cases, the transmitted control signal includes an activation downlink control information transmission. In some cases, the transmitted control signal includes a radio resource control transmission.

The transport block processing component 1220 may process the transport block by encoding or decoding the transport block based on the determined modulation order. In some examples, the transport block processing component 1220 may process the transport block by encoding or decoding the transport block based on the determined modulation order.

In some examples, the transport block processing component 1220 may encode the transport block in accordance with the determined modulation order. In some examples, the transport block processing component 1220 may transmit the encoded transport block to the UE.

In some examples, the transport block processing component 1220 may decode the encoded transport block in accordance with the determined modulation order. In some examples, the transport block processing component 1220 may encode the transport block in accordance with the determined modulation order.

The transport block interface 1225 may receive the transport block from the UE. In some examples, the transport block interface 1225 may transmit the encoded transport block to the UE.

In some examples, the transport block interface 1225 may receive the transport block from the UE. The configuration component 1230 may transmit, to the UE, a radio resource control signal indicating the at least two modulation orders, an identification of the prior transmission, a modulation order threshold, or a combination thereof. In some examples, the configuration component 1230 may transmit, to the UE, a radio resource control signal indicating the differential indication, the prior modulation order, or a combination thereof.

Figure 13:
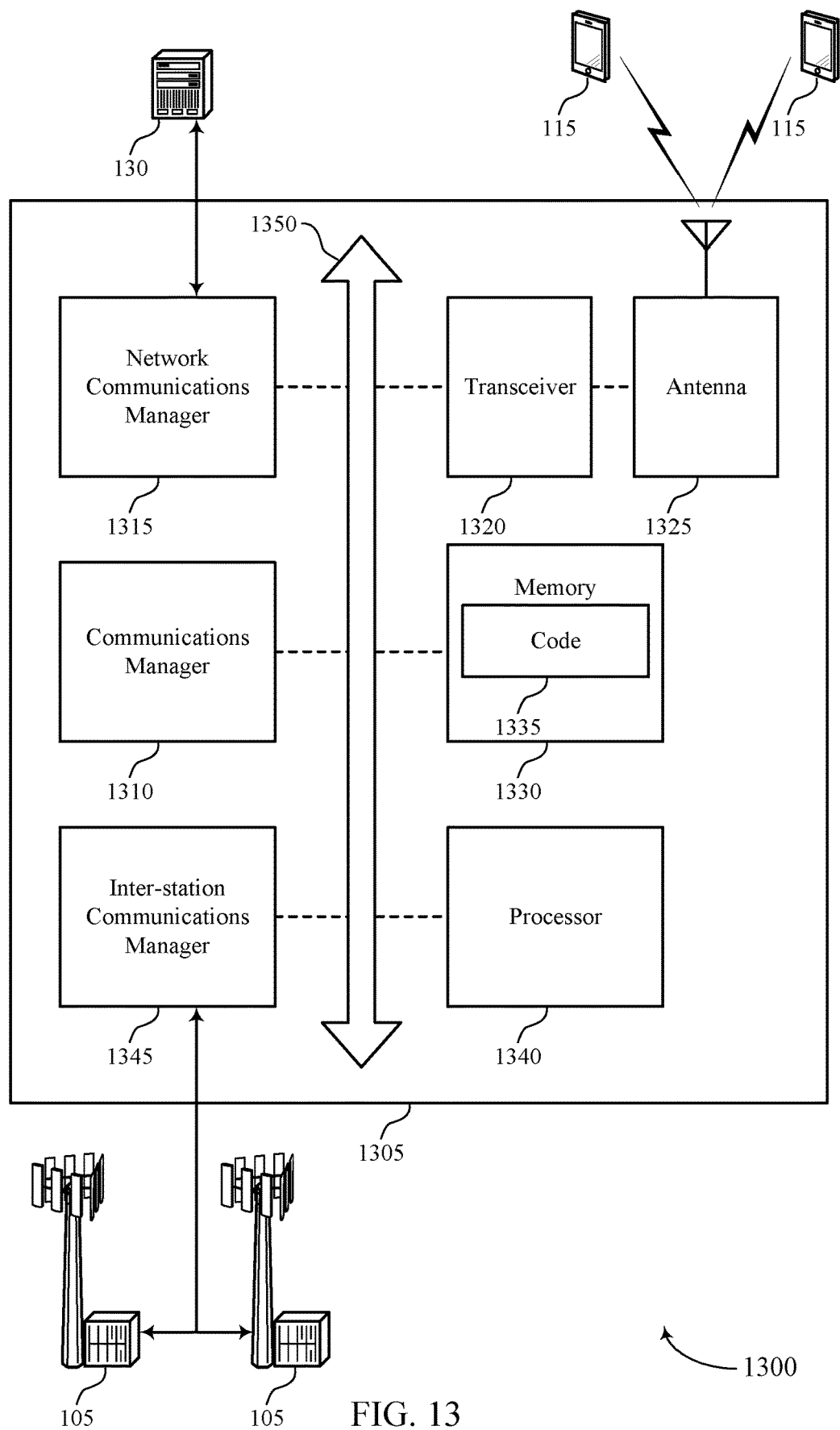
FIG. 13 shows a diagram of a system including a device that supports flexible implicit modulation and coding scheme indication in accordance with aspects of the present disclosure.

FIG. 13 shows a diagram of a system 1300 including a device 1305 that supports flexible implicit modulation and coding scheme indication in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a UE, an indication of a modulation and coding scheme index to be applied to encoding or decoding of a transport block, where the modulation and coding scheme index is associated with at least two modulation orders, determine a modulation order of the at least two modulation orders based on a prior modulation order associated with a prior transmission of the transport block, and process the transport block by encoding or decoding the transport block based on the determined modulation order. The communications manager 1310 may also transmit, to a UE, an indication of a modulation and coding scheme index to be applied to encoding or decoding of a transport block, where the modulation and coding scheme index is associated with a differential indication of a modulation order, determine a modulation order for encoding or decoding the transport block based on the differential indication and a prior modulation order associated with a prior transmission of the transport block, and process the transport block by encoding or decoding the transport block based on the determined modulation order.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting flexible implicit modulation and coding scheme indication).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
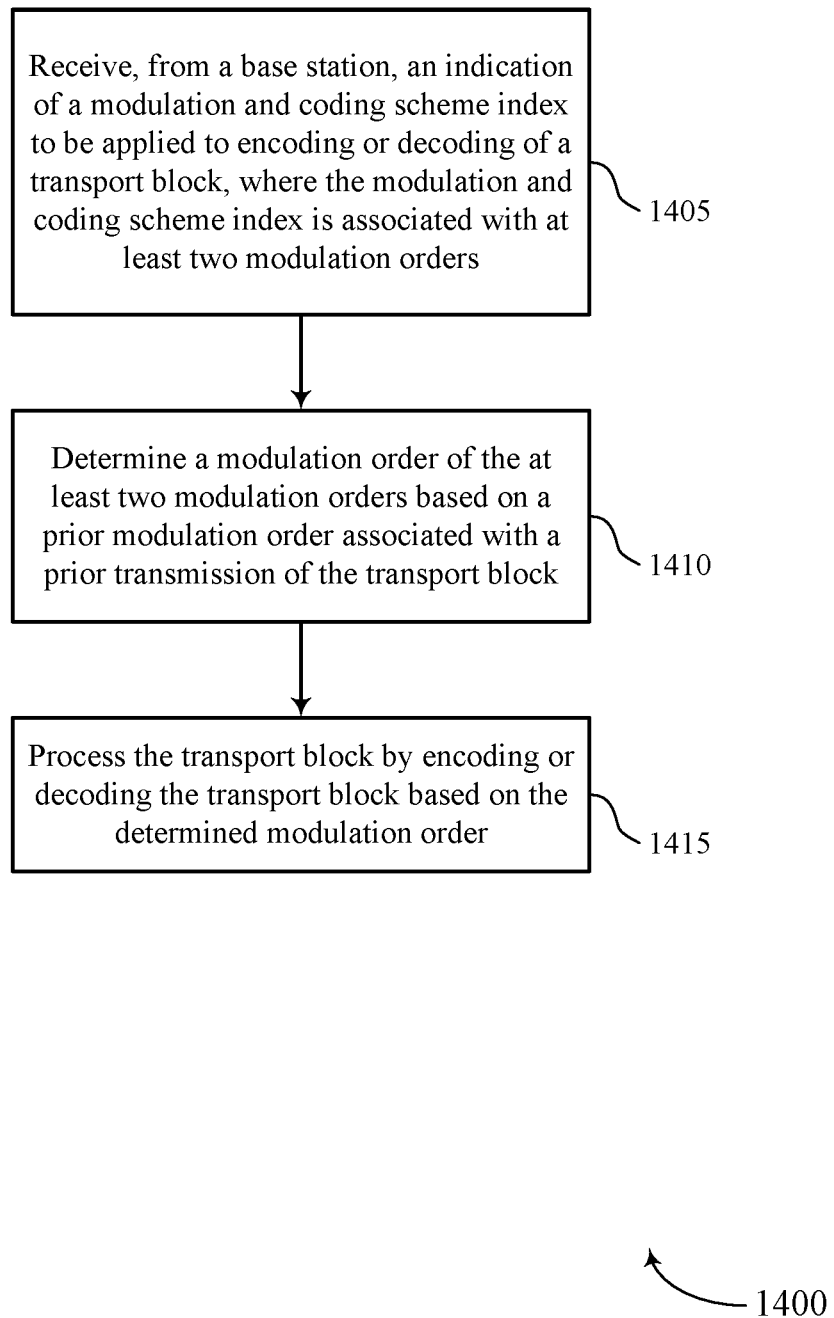
FIGS. 14 through 17 show flowcharts illustrating methods that support flexible implicit modulation and coding scheme indication in accordance with aspects of the present disclosure.

FIG. 14 shows a flowchart illustrating a method 1400 that supports flexible implicit modulation and coding scheme indication in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, an indication of a modulation and coding scheme index to be applied to encoding or decoding of a transport block, where the modulation and coding scheme index is associated with at least two modulation orders. The operations of 1405 may be performed according to the methods described herein. In some examples, aspects of the operations of 1405 may be performed by a modulation and coding scheme interface as described with reference to FIGS. 6 through 9.

At 1410, the UE may determine a modulation order of the at least two modulation orders based on a prior modulation order associated with a prior transmission of the transport block. The operations of 1410 may be performed according to the methods described herein. In some examples, aspects of the operations of 1410 may be performed by a modulation order component as described with reference to FIGS. 6 through 9.

At 1415, the UE may process the transport block by encoding or decoding the transport block based on the determined modulation order. The operations of 1415 may be performed according to the methods described herein. In some examples, aspects of the operations of 1415 may be performed by a transport block processing component as described with reference to FIGS. 6 through 9.

Figure 15:
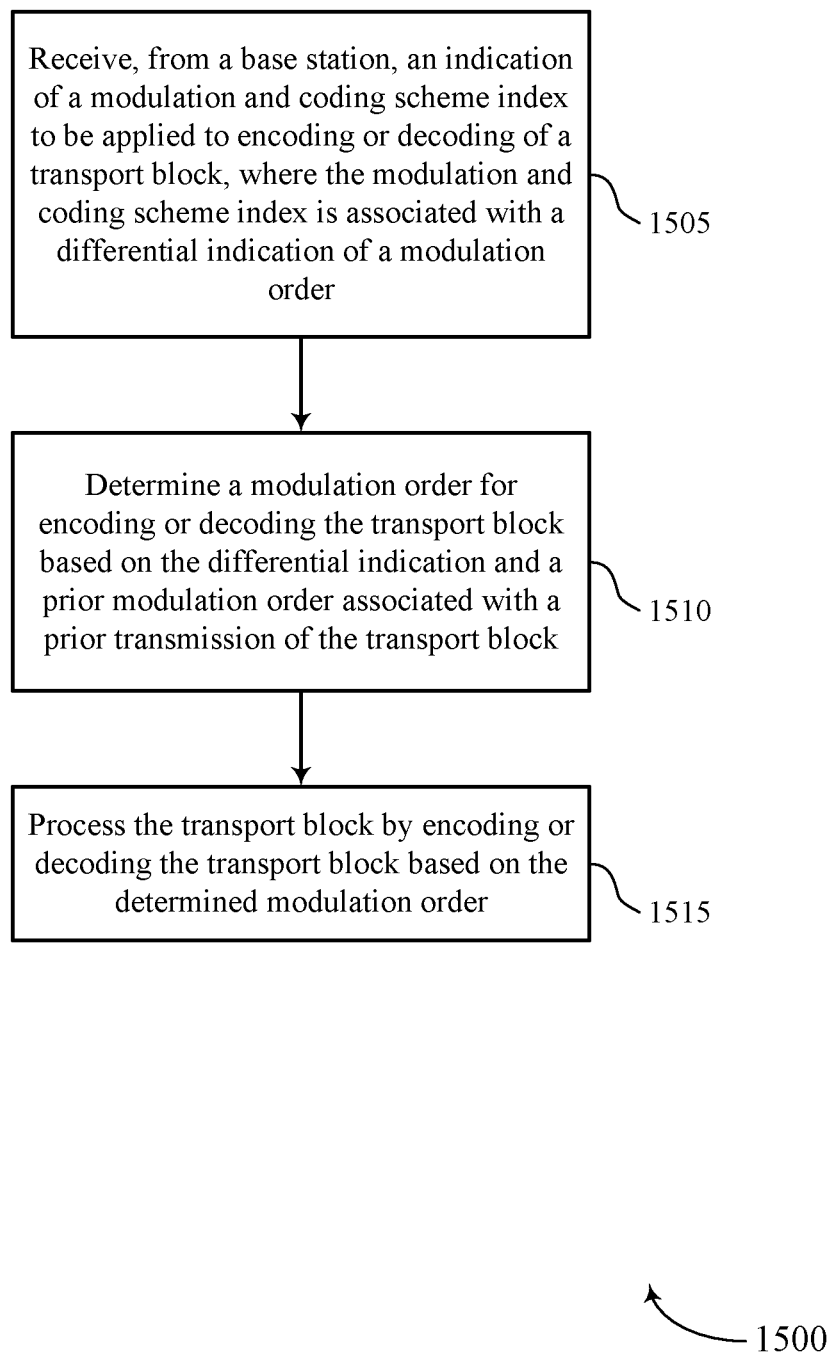

FIG. 15 shows a flowchart illustrating a method 1500 that supports flexible implicit modulation and coding scheme indication in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, an indication of a modulation and coding scheme index to be applied to encoding or decoding of a transport block, where the modulation and coding scheme index is associated with a differential indication of a modulation order. The operations of 1505 may be performed according to the methods described herein. In some examples, aspects of the operations of 1505 may be performed by a modulation and coding scheme interface as described with reference to FIGS. 6 through 9.

At 1510, the UE may determine a modulation order for encoding or decoding the transport block based on the differential indication and a prior modulation order associated with a prior transmission of the transport block. The operations of 1510 may be performed according to the methods described herein. In some examples, aspects of the operations of 1510 may be performed by a modulation order component as described with reference to FIGS. 6 through 9.

At 1515, the UE may process the transport block by encoding or decoding the transport block based on the determined modulation order. The operations of 1515 may be performed according to the methods described herein. In some examples, aspects of the operations of 1515 may be performed by a transport block processing component as described with reference to FIGS. 6 through 9.

Figure 16:
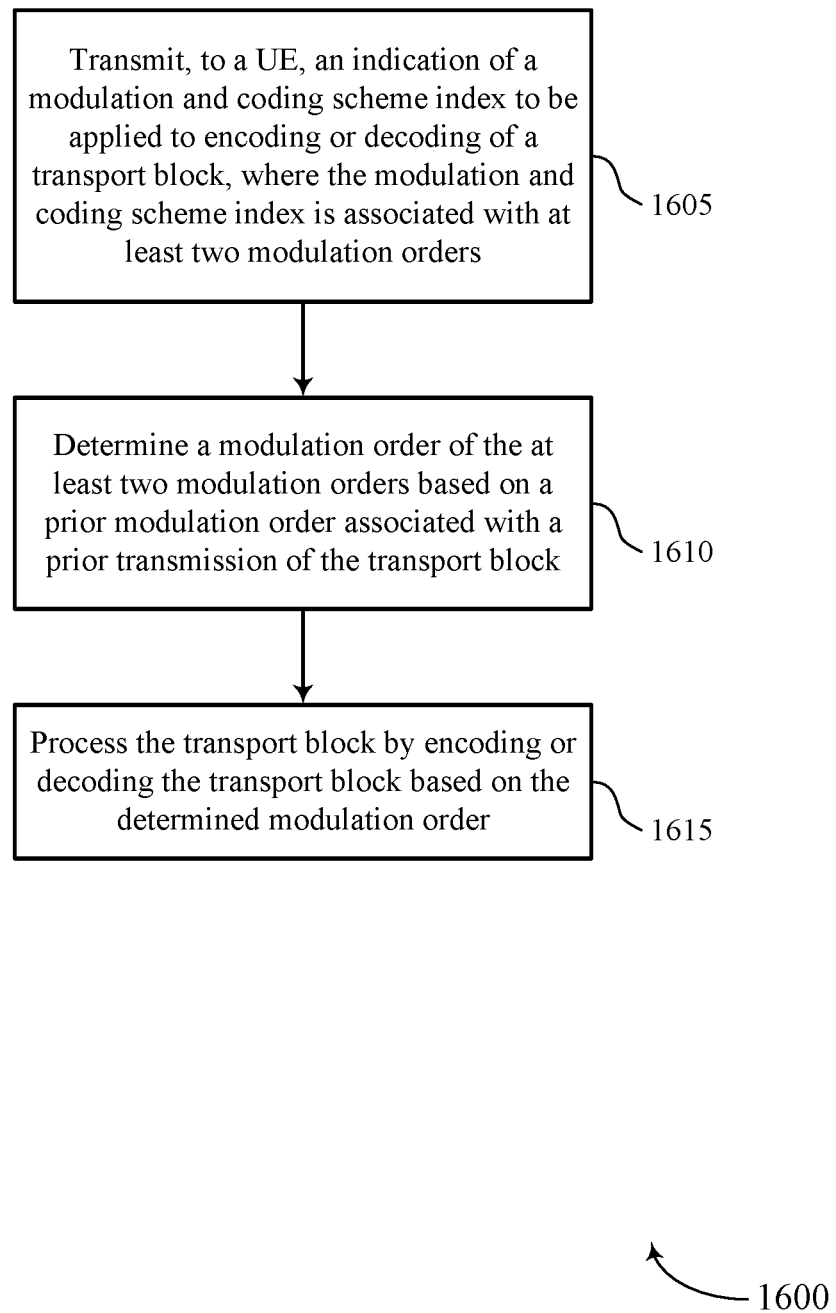

FIG. 16 shows a flowchart illustrating a method 1600 that supports flexible implicit modulation and coding scheme indication in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may transmit, to a UE, an indication of a modulation and coding scheme index to be applied to encoding or decoding of a transport block, where the modulation and coding scheme index is associated with at least two modulation orders. The operations of 1605 may be performed according to the methods described herein. In some examples, aspects of the operations of 1605 may be performed by a modulation and coding scheme interface as described with reference to FIGS. 10 through 13.

At 1610, the base station may determine a modulation order of the at least two modulation orders based on a prior modulation order associated with a prior transmission of the transport block. The operations of 1610 may be performed according to the methods described herein. In some examples, aspects of the operations of 1610 may be performed by a modulation order component as described with reference to FIGS. 10 through 13.

At 1615, the base station may process the transport block by encoding or decoding the transport block based on the determined modulation order. The operations of 1615 may be performed according to the methods described herein. In some examples, aspects of the operations of 1615 may be performed by a transport block processing component as described with reference to FIGS. 10 through 13.

Figure 17:
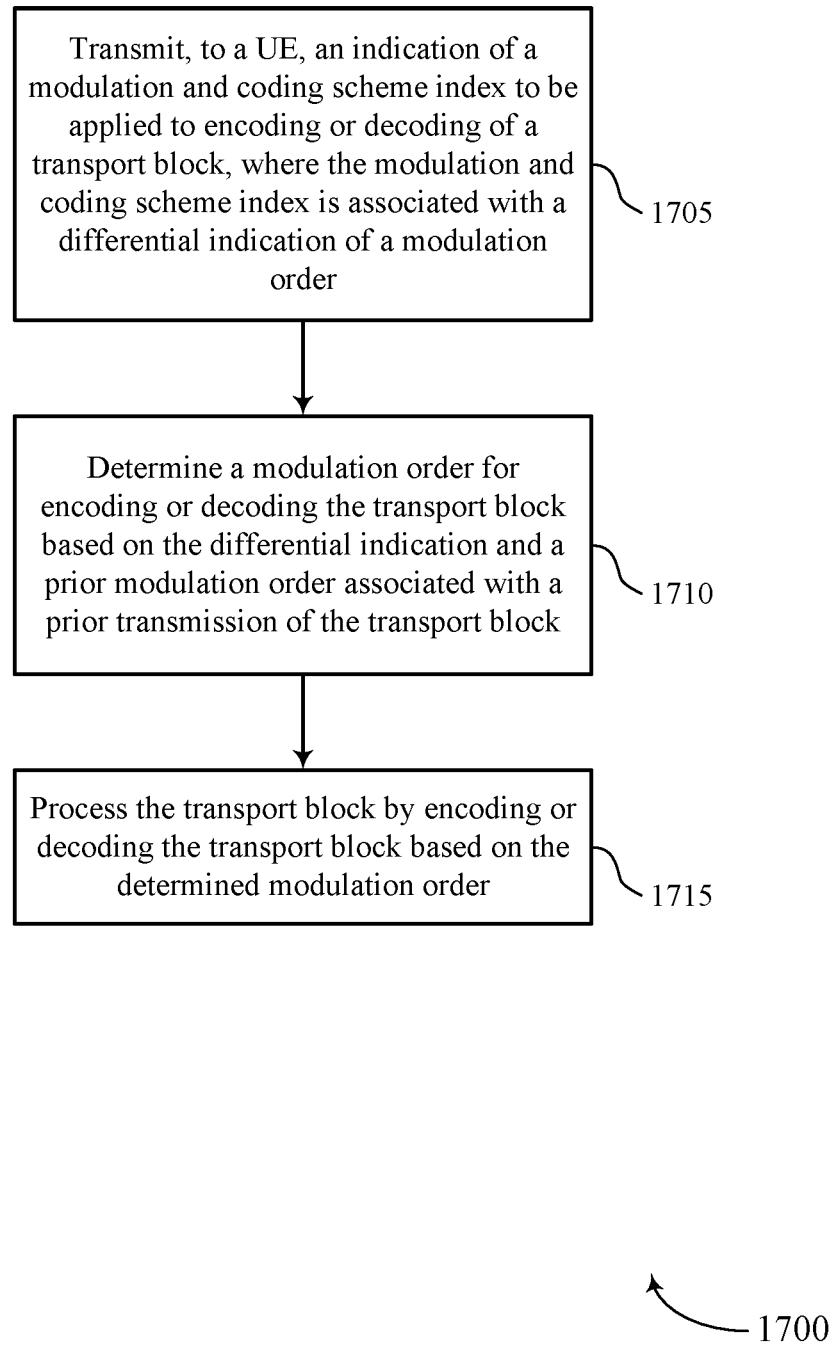

FIG. 17 shows a flowchart illustrating a method 1700 that supports flexible implicit modulation and coding scheme indication in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may transmit, to a UE, an indication of a modulation and coding scheme index to be applied to encoding or decoding of a transport block, where the modulation and coding scheme index is associated with a differential indication of a modulation order. The operations of 1705 may be performed according to the methods described herein. In some examples, aspects of the operations of 1705 may be performed by a modulation and coding scheme interface as described with reference to FIGS. 10 through 13.

At 1710, the base station may determine a modulation order for encoding or decoding the transport block based on the differential indication and a prior modulation order associated with a prior transmission of the transport block. The operations of 1710 may be performed according to the methods described herein. In some examples, aspects of the operations of 1710 may be performed by a modulation order component as described with reference to FIGS. 10 through 13.

At 1715, the base station may process the transport block by encoding or decoding the transport block based on the determined modulation order. The operations of 1715 may be performed according to the methods described herein. In some examples, aspects of the operations of 1715 may be performed by a transport block processing component as described with reference to FIGS. 10 through 13.

Example 1

A method of wireless communication at a user equipment (UE), comprising: receiving, from a base station, an indication of a modulation and coding scheme index to be applied to encoding or decoding of a transport block, wherein the modulation and coding scheme index is associated with at least two modulation orders; determining a modulation order of the at least two modulation orders based at least in part on a prior modulation order associated with a prior transmission of the transport block; and processing the transport block by encoding or decoding the transport block based at least in part on the determined modulation order.

Example 2

The method of example 1, wherein determining the modulation order further comprises: comparing the prior modulation order to a modulation order threshold; and determining the modulation order based at least in part on the comparing.

Example 3

The method of any of examples 1 and 2, further comprising: determining the prior modulation order in accordance with a control signal scheduling the prior transmission of the transport block, wherein the prior transmission of the transport block is a most recent transmission of the transport block.

Example 4

The method of example 3, wherein the control signal indicates a modulation and coding scheme index associated with a target code rate for the most recent transmission of the transport block.

Example 5

The method of any of examples 1 to 4, wherein the prior transmission is a most recent prior transmission of the transport block transmitted with a modulation and coding scheme index that corresponds to a single modulation order.

Example 6

The method of any of examples 1 to 5, further comprising: determining the prior modulation order in accordance with a control signal scheduling the prior transmission of the transport block, wherein the prior transmission is a first detected transmission of the transport block.

Example 7

The method of any of examples 1 to 6, wherein the control signal comprises an activation downlink control information transmission.

Example 8

The method of any of examples 1 to 6, wherein the control signal comprises a radio resource control transmission.

Example 9

The method of any of examples 1 to 8, wherein processing the transport block comprises: encoding the transport block in accordance with the determined modulation order; and encoding the transport block in accordance with the determined modulation order; and transmitting the encoded transport block to the base station.

Example 10

The method of any of examples 1 to 8, wherein processing the transport block comprises: receiving the transport block encoded in accordance with the determined modulation order; and decoding the encoded transport block in accordance with the determined modulation order.

Example 11

The method of any of examples 1 to 10, wherein the modulation and coding scheme index is associated with the at least two modulation orders in accordance with a modulation and coding scheme table, wherein each modulation and coding scheme index of the modulation and coding scheme table is associated with at least two modulation orders.

Example 12

The method of any of examples 1 to 10, wherein the modulation and coding scheme index is associated with the at least two modulation orders in accordance with a modulation and coding scheme table, wherein a subset of modulation and coding scheme indices of the modulation and coding scheme table is associated with at least two modulation orders.

Example 13

The method of any of examples 1 to 13, wherein each modulation and coding scheme index associated with a modulation order of a modulation and coding scheme index table includes an indication of a target code rate.

Example 14

The method of any of examples 1 to 13, wherein the at least two modulation orders, an identification of the prior transmission, a modulation order threshold, or a combination thereof are predefined at the UE.

Example 15

The method of any of examples 1 to 12, further comprising: receiving a radio resource control signal indicating the at least two modulation orders, an identification of the prior transmission, a modulation order threshold, or a combination thereof.

Example 16

A method of wireless communication at a user equipment (UE) comprising: receiving, from a base station, an indication of a modulation and coding scheme index to be applied to encoding or decoding of a transport block, wherein the modulation and coding scheme index is associated with a differential indication of a modulation order; determining a modulation order for encoding or decoding the transport block based at least in part on the differential indication and a prior modulation order associated with a prior transmission of the transport block; and processing the transport block by encoding or decoding the transport block based at least in part on the determined modulation order.

Example 17

The method of example 16, wherein the indicated modulation and coding scheme index is associated with at least two differential indications, the method further comprising: comparing the prior modulation order to a modulation order threshold; and determining the differential indication of the at least two differential indications based at least in part on the comparing.

Example 18

The method of any of examples 16 and 17, further comprising: identifying the modulation order as a minimum modulation order of a modulation and coding scheme index table based at least in part on the differential indication and the prior modulation order.

Example 19

The method of any of examples 16 to 18, further comprising: identifying the modulation order from a modulation and coding scheme index table based at least in part on the differential indication and the prior modulation order, wherein the differential indication specifies a higher modulation and coding scheme index than the modulation and coding scheme index associated with the prior transmission.

Example 20

The method of any of examples 16 to 19, further comprising: identifying the modulation order from a modulation and coding scheme index table based at least in part on the differential indication and the prior modulation order, wherein the differential indication specifies a higher modulation and coding scheme index than the modulation and coding scheme index associated with the prior transmission.

Example 21

The method of any of examples 16 to 20, further comprising: determining the prior modulation order in accor-

43 dance with a control signal scheduling the prior transmission of the transport block, wherein the prior transmission of the transport block is a most recent transmission of the transport block.

Example 22

The method of example 21, wherein the control signal indicates a modulation and coding scheme index associated with a target code rate.

Example 23

The method of any of examples 16 to 22, further comprising: determining the prior modulation order in accordance with a control signal scheduling a first detected transmission of the transport block.

Example 24

The method of any of examples 16 to 23, wherein the control signal comprises an activation downlink control information transmission.

Example 25

The method of any of examples 16 to 23, wherein the control signal comprises a radio resource control transmission.

Example 26

The method of any of examples 16 to 25, wherein the differential indication of the modulation order, the prior modulation order, or a combination thereof are predefined at the UE.

Example 27

The method of any of examples 16 to 26, further comprising: receiving, from the base station, a radio resource control signal indicating the differential indication, the prior modulation order, or a combination thereof.

Example 28

A method for wireless communication at a base station, comprising: transmitting, to a user equipment (UE), an indication of a modulation and coding scheme index to be applied to encoding or decoding of a transport block, wherein the modulation and coding scheme index is associated with at least two modulation orders; determining a modulation order of the at least two modulation orders based at least in part on a prior modulation order associated with a prior transmission of the transport block; and processing the transport block by encoding or decoding the transport block based at least in part on the determined modulation order.

Example 29

The method of example 28, wherein determining the modulation order further comprises: comparing the prior modulation order to a modulation order threshold; and determining the modulation order based at least in part on the comparing.

44

Example 30

The method of any of examples 28 and 29, determining the prior modulation order in accordance with a transmitted control signal scheduling the prior transmission of the transport block, wherein the prior transmission of the transport block is a most recent transmission of the transport block.

Example 31

The method of example 30, wherein the transmitted control signal indicates a modulation and coding scheme index associated with a target code rate for the prior transmission of the transport block.

Example 32

The method of any of examples 28 to 31, wherein the prior transmission is a most recent prior transmission of the transport block transmitted with a modulation and coding scheme index that corresponds to a single modulation order.

Example 33

The method of any of examples 28 to 32, determining the prior modulation order in accordance with a control signal scheduling the prior transmission of the transport block, wherein the prior transmission is a first detected transmission of the transport block.

Example 34

The method of any of examples 28, 31, and 33, wherein the control signal comprises an activation downlink control information transmission.

Example 35

The method of any of examples 28, 31, and 33, wherein the control signal comprises a radio resource control transmission.

Example 36

The method of any of examples 28 to 35, wherein processing the transport block comprises: encoding the transport block in accordance with the determined modulation order; and transmitting the encoded transport block to the UE.

Example 37

The method of any of examples 28 to 35, wherein processing the transport block comprises: receiving the transport block from the UE; and decoding the encoded transport block in accordance with the determined modulation order.

Example 38

The method of any of examples 28 to 37, wherein the modulation and coding scheme index is associated with the at least two modulation orders in accordance with a modulation and coding scheme table, wherein each modulation and coding scheme index of the modulation and coding scheme table is associated with at least two modulation orders.

Example 39

The method of any of examples 28 to 37, wherein the modulation and coding scheme index is associated with the at least two modulation orders in accordance with a modulation and coding scheme table, wherein a subset of modulation and coding scheme indices of the modulation and coding scheme table is associated with at least two modulation orders.

Example 40

The method of any of examples 28 to 39, wherein each modulation and coding scheme index associated with a modulation order of a modulation and coding scheme index table includes an indication of a target code rate.

Example 41

The method of any of examples 28 to 40, further comprising: transmitting, to the UE, a radio resource control signal indicating the at least two modulation orders, an identification of the prior transmission, a modulation order threshold, or a combination thereof.

Example 42

A method of wireless communication at a base station, comprising: transmitting, to a user equipment (UE), an indication of a modulation and coding scheme index to be applied to encoding or decoding of a transport block, wherein the modulation and coding scheme index is associated with a differential indication of a modulation order; determining a modulation order for encoding or decoding the transport block based at least in part on the differential indication and a prior modulation order associated with a prior transmission of the transport block; and processing the transport block by encoding or decoding the transport block based at least in part on the determined modulation order.

Example 43

The method of example 42, wherein the indicated modulation and coding scheme index is associated with at least two differential indications, the method further comprising: comparing the prior modulation order to a modulation order threshold; and determining the differential indication of the at least two differential indications based at least in part on the comparing.

Example 44

The method of any of examples 42 and 43, identifying the modulation order as a minimum modulation order of a modulation and coding scheme index table based at least in part on the differential indication and the prior modulation order.

Example 45

The method of any of examples 42 to 44, further comprising: identifying the modulation order from a modulation and coding scheme index table based at least in part on the differential indication and the prior modulation order, wherein the differential indication specifies a higher modulation and coding scheme index than the modulation and coding scheme index associated with the prior transmission.

Example 46

The method of any of examples 42 to 45, further comprising: determining the prior modulation order in accordance with a transmitted control signal scheduling the prior transmission of the transport block, wherein the prior transmission of the transport block is a most recent transmission of the transport block.

Example 47

The method of example 46, wherein the transmitted control signal indicates a modulation and coding scheme index associated with a target code rate.

Example 48

The method of any of examples 42 to 47, further comprising: determining the prior modulation order in accordance with a transmitted control signal scheduling a first detected transmission of the transport block.

Example 49

The method of any of examples 46 to 48, wherein the transmitted control signal comprises an activation downlink control information transmission.

Example 50

The method of any of examples 46 to 48, wherein the transmitted control signal comprises a radio resource control transmission.

Example 51

The method of any of examples 42 to 50, wherein processing the transport block comprises: encoding the transport block in accordance with the determined modulation order; and transmitting the encoded transport block to the UE.

Example 52

The method of any of examples 42 to 50, wherein processing the transport block comprises: receiving the transport block from the UE; and decoding the encoded transport block in accordance with the determined modulation order.

Example 53

The method of any of examples 42 to 52, further comprising: transmitting, to the UE, a radio resource control signal indicating the differential indication, the prior modulation order, or a combination thereof.

Example 54

An apparatus for wireless communication comprising at least one means for performing a method of any of examples 1 to 54.

Example 55

An apparatus for wireless communication comprising: a processor; memory coupled with the processor; and instructions stored in the memory and executable by the processor to cause the apparatus to perform a method of any of examples 1 to 54.

Example 56

A non-transitory computer-readable medium storing code for wireless communications, the code comprising instructions executable by a processor to perform a method of any of examples 1 to 54.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
receiving, from a network entity, an indication of a modulation and coding scheme index to be applied to encoding or decoding of a transport block, the modulation and coding scheme index indicating at least two modulation orders in a modulation and coding scheme index table;
comparing, based at least in part on receiving the indication of the modulation and coding scheme index that indicates the at least two modulation orders in the modulation and coding scheme index table, a prior modulation order associated with a prior transmission of the transport block to a modulation order threshold;
determining a modulation order of the at least two modulation orders indicated by the modulation and coding scheme index in the modulation and coding scheme index table based at least in part on the comparing; and
processing the transport block by encoding or decoding the transport block based at least in part on the determined modulation order.

2. The method of claim 1, further comprising:
determining the prior modulation order in accordance with a control signal scheduling the prior transmission of the transport block, wherein the prior transmission of the transport block is a most recent transmission of the transport block.

3. The method of claim 2, wherein the control signal indicates a modulation and coding scheme index associated with a target code rate for the most recent transmission of the transport block.

4. The method of claim 1, wherein the prior transmission is a most recent prior transmission of the transport block transmitted with a modulation and coding scheme index that corresponds to a single modulation order.

5. The method of claim 1, further comprising:
determining the prior modulation order in accordance with a control signal scheduling the prior transmission of the transport block, wherein the prior transmission is a first detected transmission of the transport block.

6. The method of claim 5, wherein the control signal comprises an activation downlink control information transmission.

7. The method of claim 5, wherein the control signal comprises a radio resource control transmission.

8. The method of claim 1, wherein at least a subset of modulation and coding scheme indices of the modulation and coding scheme index table is associated with at least two modulation orders.

9. The method of claim 1, wherein each modulation and coding scheme index association with a modulation order of the modulation and coding scheme index table includes an indication of a target code rate.

10. The method of claim 1, wherein the at least two modulation orders, an identification of the prior transmission, the modulation order threshold, or a combination thereof are predefined at the UE.

11. The method of claim 1, further comprising: receiving a radio resource control signal indicating the at least two modulation orders, an identification of the prior transmission, the modulation order threshold, or a combination thereof.

12. A method for wireless communication at a user equipment (UE), comprising:
receiving, from a network entity, an indication of a modulation and coding scheme index to be applied to encoding or decoding of a transport block, the modulation and coding scheme index indicating at least two differential indication values in a modulation and coding scheme index table, wherein a differential indication value of the at least two differential indication values is to be applied to a prior modulation order;
comparing, based at least in part on receiving the indication of the modulation and coding scheme index that indicates the at least two differential indication values in the modulation and coding scheme index table, a prior modulation order associated with a prior transmission of the transport block to a modulation order threshold;
determining a modulation order for encoding or decoding the transport block based at least in part on the differential indication value of the at least two differential indication values indicated by the modulation and coding scheme index in the modulation and coding scheme index table and the prior modulation order associated with a prior transmission of the transport block, the differential indication value determined as a result of the comparing; and
processing the transport block by encoding or decoding the transport block based at least in part on the determined modulation order.

13. The method of claim 12, further comprising:
identifying the modulation order as a minimum modulation order of the modulation and coding scheme index table based at least in part on the differential indication value and the prior modulation order.

14. The method of claim 12, further comprising:
identifying the modulation order from the modulation and coding scheme index table based at least in part on the differential indication value and the prior modulation order, wherein the differential indication value specifies a higher modulation and coding scheme index than the modulation and coding scheme index associated with the prior transmission.

15. The method of claim 12, further comprising:
determining the prior modulation order in accordance with a control signal scheduling the prior transmission of the transport block, wherein the prior transmission of the transport block is a most recent transmission of the transport block.

16. The method of claim 15, wherein the control signal indicates a modulation and coding scheme index associated with a target code rate.

17. The method of claim 12, further comprising:
determining the prior modulation order in accordance with a control signal scheduling a first detected transmission of the transport block.

18. The method of claim 17, wherein the control signal comprises an activation downlink control information transmission.

19. The method of claim 17, wherein the control signal comprises a radio resource control transmission.

20. The method of claim 12, wherein the differential indication value of the modulation order, the prior modulation order, or a combination thereof are predefined at the UE.

21. The method of claim 12, further comprising:
receiving, from the network entity, a radio resource control signal indicating the differential indication value, the prior modulation order, or a combination thereof.

22. An apparatus for wireless communication at a user equipment (UE), comprising:
a processor,
memory coupled with the processor; and
instructions stored in the memory and executable by the processor to cause the apparatus to:
receive, from a network entity, an indication of a modulation and coding scheme index to be applied to encoding or decoding of a transport block, the modulation and coding scheme index indicating at least two modulation orders in a modulation and coding scheme index table;
compare, based at least in part on receiving the indication of the modulation and coding scheme index that indicates the at least two modulation orders in the modulation and coding scheme index table, a prior modulation order associated with a prior transmission of the transport block to a modulation order threshold;
determine a modulation order of the at least two modulation orders indicated by the modulation and coding scheme index in the modulation and coding scheme index table based at least in part on the comparing; and
process the transport block by encoding or decoding the transport block based at least in part on the determined modulation order.

23. The apparatus of claim 22, wherein the instructions are further executable by the processor to cause the apparatus to:
determine the prior modulation order in accordance with a control signal scheduling the prior transmission of the transport block, wherein the prior transmission of the transport block is a most recent transmission of the transport block.

24. The apparatus of claim 23, wherein the control signal indicates a modulation and coding scheme index associated with a target code rate for the most recent transmission of the transport block.

25. The apparatus of claim 22, wherein the prior transmission is a most recent prior transmission of the transport block transmitted with a modulation and coding scheme index that corresponds to a single modulation order.

26. The apparatus of claim 22, wherein the instructions are further executable by the processor to cause the apparatus to:
determine the prior modulation order in accordance with a control signal scheduling the prior transmission of the transport block, wherein the prior transmission is a first detected transmission of the transport block.

27. An apparatus for wireless communication at a user equipment (UE), comprising:
a processor,
memory coupled with the processor; and
instructions stored in the memory and executable by the processor to cause the apparatus to:
receive, from a network entity, an indication of a modulation and coding scheme index to be applied to encoding or decoding of a transport block, the modulation and coding scheme index indicating at least two differential indication values in a modulation and coding scheme index table, wherein a differential indication value of the at least two differential indication values is to be applied to a prior modulation order;
compare, based at least in part on receiving the indication of the modulation and coding scheme index that indicates the at least two differential indication values in the modulation and coding scheme index table, a prior modulation order associated with a prior transmission of the transport block to a modulation order threshold;
determine a modulation order for encoding or decoding the transport block based at least in part on the differential indication value of the at least two differential indication values indicated by the modulation and coding scheme index in the modulation and coding scheme index table and the prior modulation order associated with a prior transmission of the transport block, the differential indication value determined as a result of the comparing; and
process the transport block by encoding or decoding the transport block based at least in part on the determined modulation order.

* * * * *